(12) United States Patent
Hosoki

(10) Patent No.: US 9,303,856 B2
(45) Date of Patent: Apr. 5, 2016

(54) LIGHTING DEVICE, DISPLAY DEVICE, AND TELEVISION DEVICE

(71) Applicant: Sharp Kabushiki Kaisha, Osaka-shi, Osaka (JP)

(72) Inventor: Mitsuru Hosoki, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 14/375,440

(22) PCT Filed: Jan. 25, 2013

(86) PCT No.: PCT/JP2013/051549
§ 371 (c)(1),
(2) Date: Jul. 30, 2014

(87) PCT Pub. No.: WO2013/115085
PCT Pub. Date: Aug. 8, 2013

(65) Prior Publication Data
US 2015/0009419 A1    Jan. 8, 2015

(30) Foreign Application Priority Data

Feb. 3, 2012    (JP) .................................. 2012-022082

(51) Int. Cl.
| | |
|---|---|
| *B60Q 1/06* | (2006.01) |
| *G09F 13/04* | (2006.01) |
| *G09F 13/08* | (2006.01) |
| *F21V 29/02* | (2006.01) |
| *G02F 1/1335* | (2006.01) |
| *F21V 8/00* | (2006.01) |
| *H04N 5/64* | (2006.01) |

(52) U.S. Cl.
CPC .............. *F21V 29/02* (2013.01); *G02B 6/0033* (2013.01); *G02F 1/133615* (2013.01); *H04N 5/64* (2013.01); *G02F 2001/133628* (2013.01); *G02F 2201/36* (2013.01)

(58) Field of Classification Search
CPC .............. G02F 1/133615; G02F 2001/133628; G02F 2201/36; G02B 6/0033; H04N 5/64; F21V 29/02
USPC ............... 362/600, 611, 97.2, 373, 97.3, 97.1
See application file for complete search history.

(56) References Cited

U.S. PATENT DOCUMENTS 7,651,249 B2    1/2010  Ohashi et al.
8,274,789 B2 *  9/2012  Nakamichi ....... G02F 1/133308
                                                  165/104.14

(Continued)

FOREIGN PATENT DOCUMENTS

JP    2006-059607 A    3/2006
JP    2008-286837 A    11/2008

OTHER PUBLICATIONS

Official Communication issued in International Patent Application No. PCT/JP2013/051549, mailed on Mar. 26, 2013.

*Primary Examiner* — Bao Q Truong
*Assistant Examiner* — Glenn Zimmerman
(74) *Attorney, Agent, or Firm* — Keating & Bennett, LLP

(57) ABSTRACT

A backlight unit includes a chassis, an LED, a light guide plate, a duct member, and dissipative LED attachment portion. The chassis includes a light exit portion through which light exits. The LED is arranged close to an end portion of the chassis. The light guide plate is arranged closer to a middle area of the chassis than the LED and light from the LED is guided toward the light exit portion thereby. The duct member is arranged on the side opposite to the light exit portion side of the chassis and has an air passage therein. The dissipative LED attachment portion is provided to the duct member and includes one part facing the air passage and another part protruding to inside of the chassis and to which the LED is attached.

10 Claims, 25 Drawing Sheets

(56) References Cited

U.S. PATENT DOCUMENTS

| | | |
|---|---|---|
| 8,636,374 B2 * | 1/2014 | Yu et al. .................. 362/97.3 |
| 2008/0285290 A1 | 11/2008 | Ohashi et al. |
| 2010/0110329 A1 * | 5/2010 | Kubota et al. .................. 349/60 |
| 2013/0242542 A1 * | 9/2013 | Uchimi .................. 362/97.1 |
| 2015/0192729 A1 * | 7/2015 | Hosoki .................. 362/611 |

* cited by examiner

FIG.1
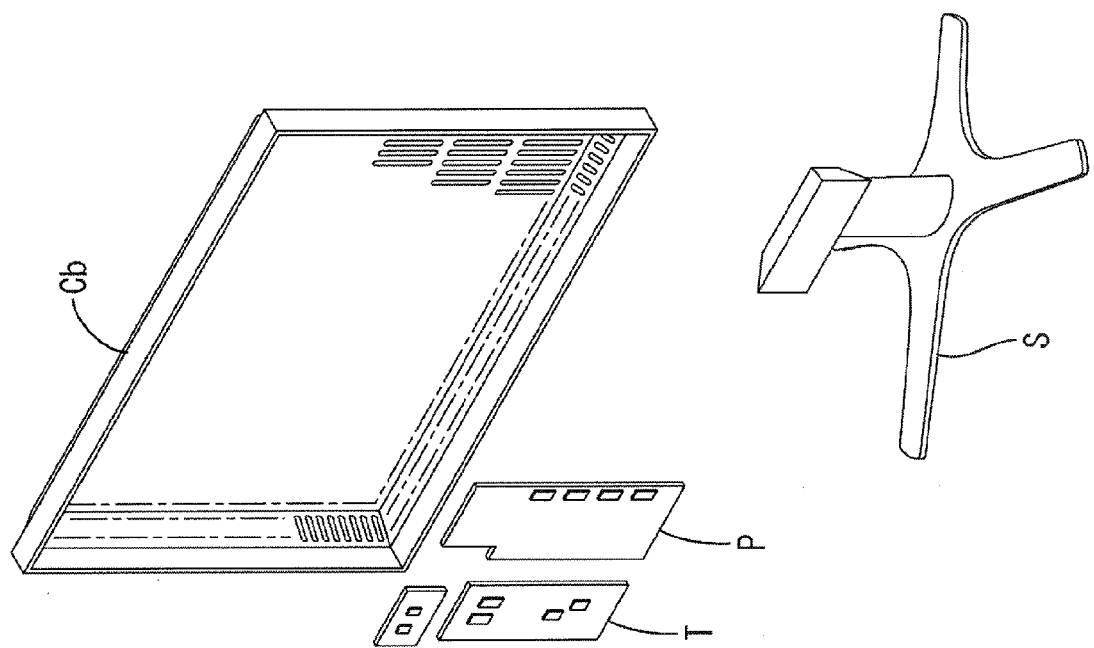
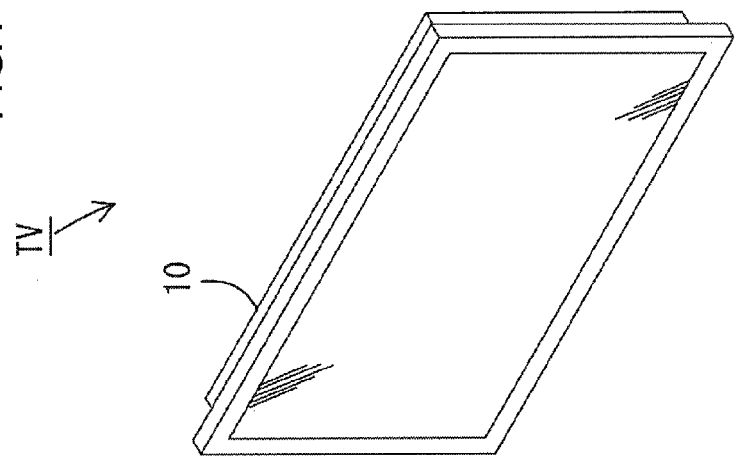
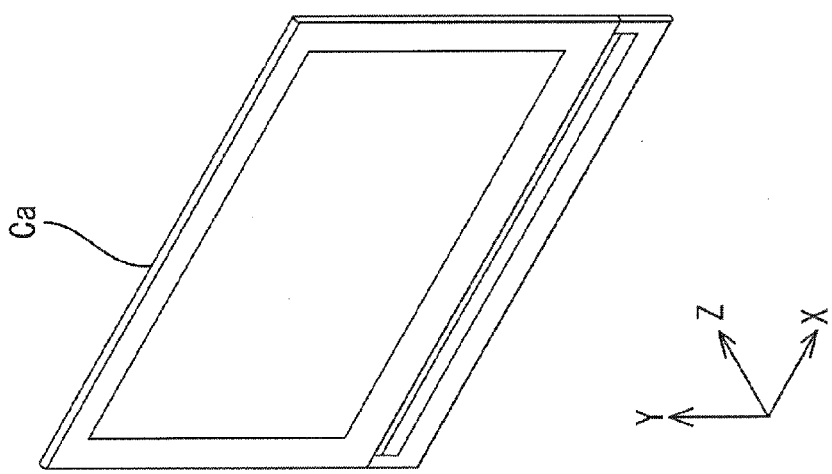

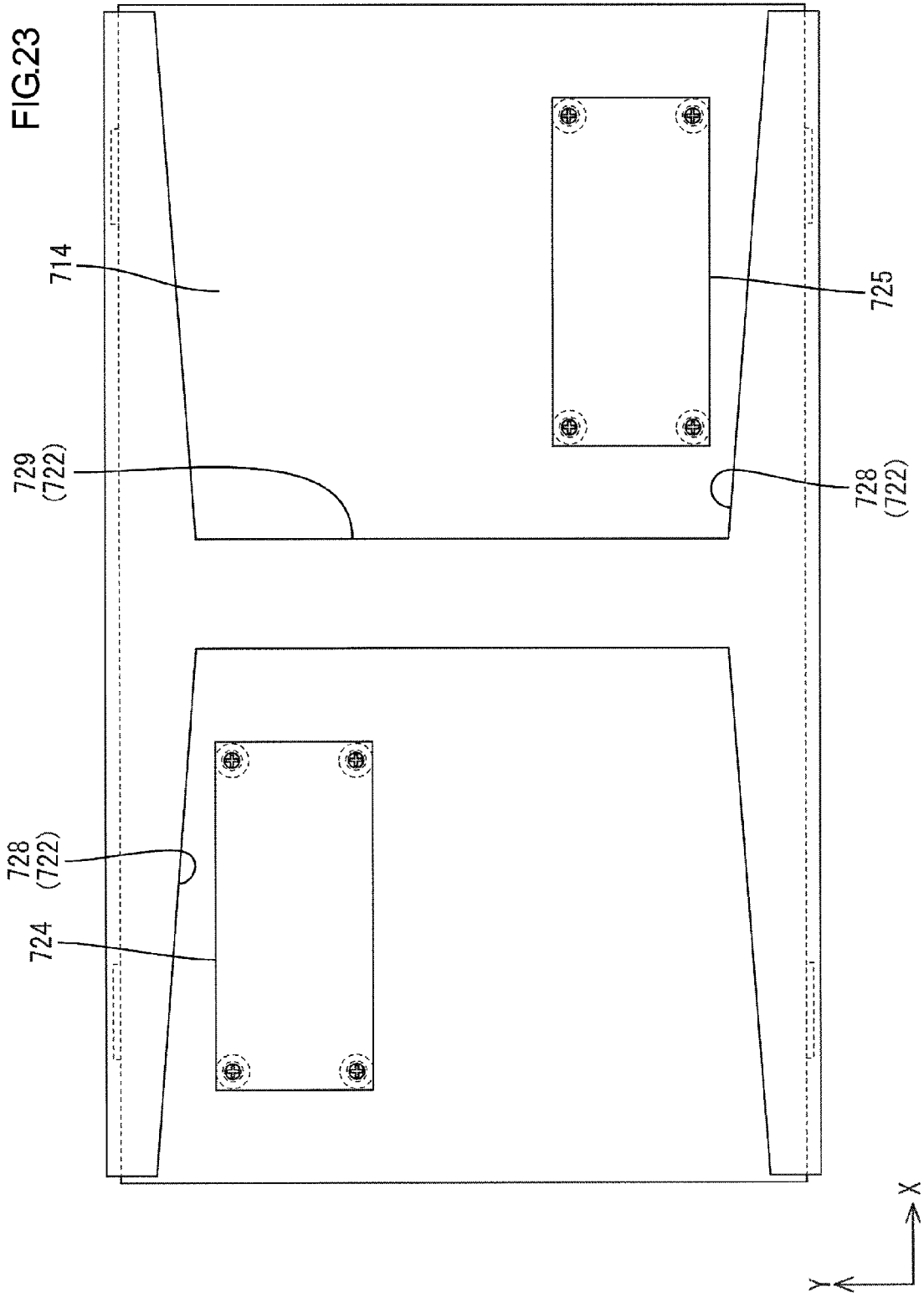

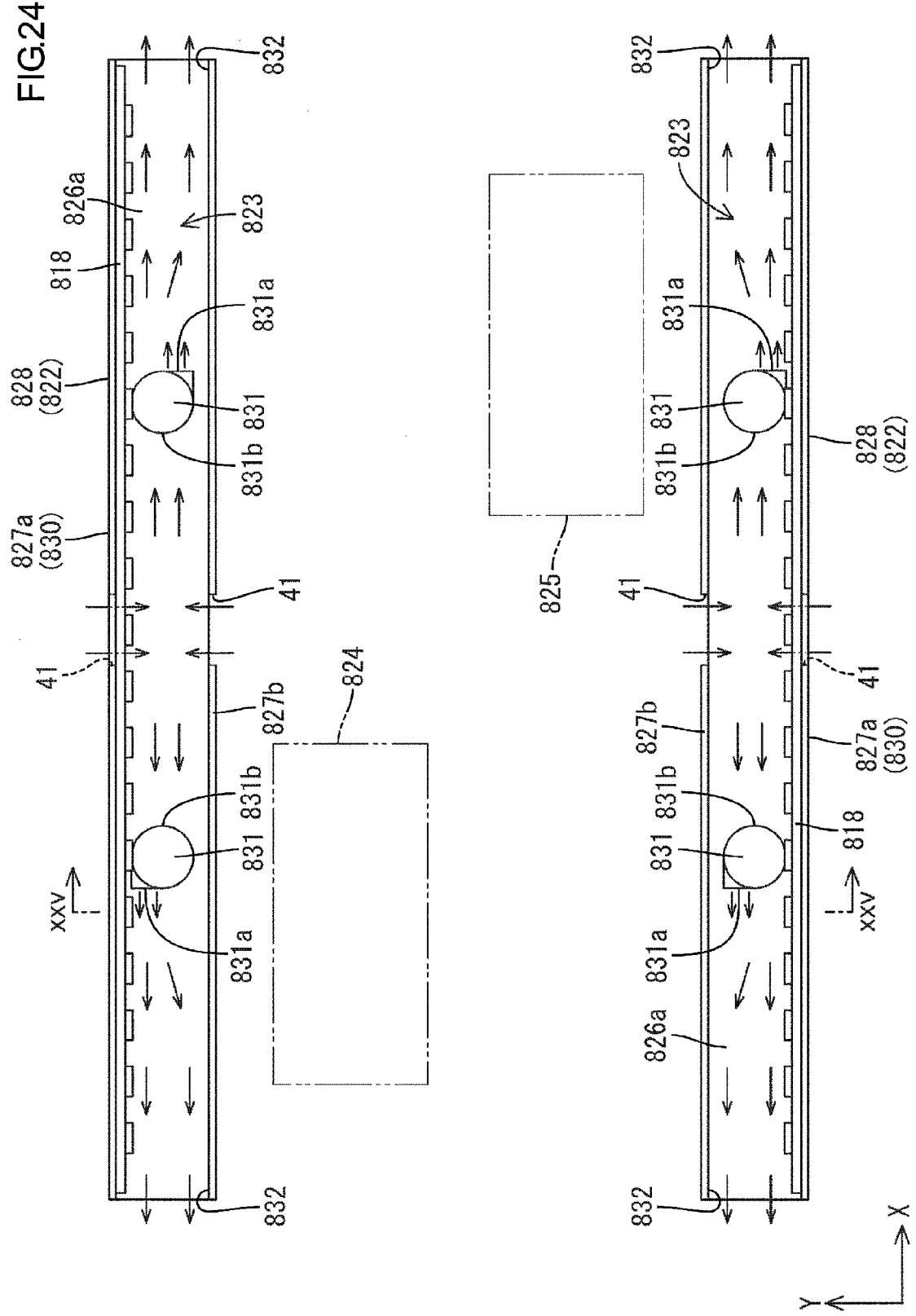

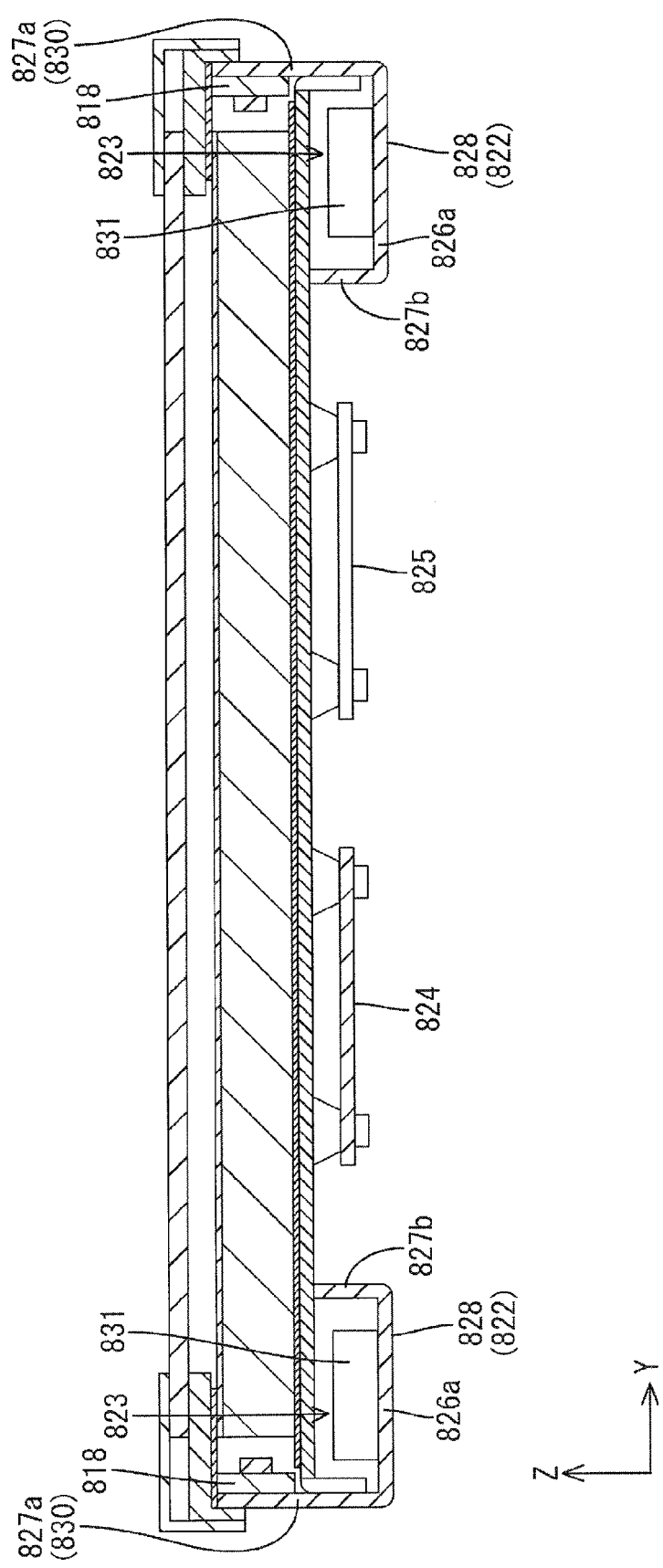

LIGHTING DEVICE, DISPLAY DEVICE, AND TELEVISION DEVICE

TECHNICAL FIELD

The present invention relates to a lighting device, a display device, and a television device.

BACKGROUND ART

A liquid crystal panel used for a liquid crystal display device such as a liquid crystal television does not emit light, and thus a backlight unit is required as a separate lighting device. The backlight unit is arranged on a back side (a side opposite to a display surface) of the liquid crystal panel. The backlight unit includes a chassis, a light source, a reflection sheet, and an optical member (a diffuser sheet). The chassis has an opening on a liquid crystal panel side. The light source is arranged in the chassis. The reflection sheet is disposed in the chassis and configured to reflect light toward the opening of the chassis. The optical member is arranged at the opening of the chassis and configured to efficiently direct light emitted from the light source toward the liquid crystal panel. One example of such a backlight unit is disclosed in Patent Document 1.

RELATED ART DOCUMENT

Patent Document

Patent Document 1: Japanese Unexamined Patent Publication No. 2006-59607

Problem to be Solved by the Invention

Patent Document 1 discloses a technology of effective heat dissipation for a direct-type backlight unit in which light sources are arranged right behind a liquid crystal panel. On the other hand, in an edge-light backlight unit, light sources are arranged concentrated at an end portion of the backlight unit and light from the light sources is directed toward a light exit side by a light guide plate. Since the light sources are arranged concentrated at the end portion of the edge-light backlight unit, heat is more likely to stay in the end portion. Therefore, sufficient heat dissipation performance may not be obtained by merely applying heat dissipation structure in Patent Document 1 to the edge-light backlight unit. Thus, a demand for higher heat dissipation performance has been raised.

Disclosure of the Present Invention

The present invention was made in view of the above reasons and an object of this invention is to improve heat dissipation properties.

Means for Solving the Problem

A lighting device according to this invention includes a chassis, a light source, a light guide member, a duct member, and a dissipative light source attachment portion. The chassis includes a light exit portion through which light exits. The light source is arranged close to an end portion of the chassis. The light guide member is arranged closer to a middle area of the chassis than the light source and configured to guide light from the light source toward a light exit portion side. The duct member is arranged on a side of the chassis opposite to the light exit portion side and has an air passage therein. The dissipative light source attachment portion is provided the duct member and one part thereof faces the air passage and another part thereof protruding to inside of the chassis. The light source is attached to the other part of the dissipative light source attachment portion.

In this configuration, the other part of the dissipative light source attachment portion protrudes to the space within the chassis, and the light source that is attached to the other part is located close to the end portion of the chassis. Light emitted from the light source is directed toward the light exit portion side of the chassis by the light guide member that is arranged in the inner area of the chassis from the light source. Heat generated by light emission of the light source is transferred to the one part of the dissipative light source attachment portion that faces the air passage of the duct member, and the heat is efficiently dissipated through air that flows through the air passage. With this configuration, even in the lighting device in which the light source is arranged close to the end portion of the chassis and heat is more likely to stay the end portion, heat dissipation properties remain high. Therefore, brightness of exiting light may be easily enhanced by increasing output of the light source.

The following configurations are preferable as aspects of this invention.

(1) The lighting device may further include a blower mounted to the duct member. The blower may have a blowing port that faces a part of the dissipative light source attachment portion. Air flows to the air passage through the blowing port. With this configuration, the air passing through the blowing port of the blower toward the air passage efficiently hits a part of the dissipative light source attachment portion opposite thereto, and thus heat from the light source is efficiently dissipated.

(2) The duct member may include a bottom wall and at least a pair of sidewalls. The bottom wall may be opposite the chassis. The sidewalls may protrude from the bottom wall toward the chassis and face each other. The air passage may be a space surrounded and defined by the bottom wall, the at least a pair of sidewalls, and the chassis. With this configuration, the chassis can be reinforced by the duct member including the bottom wall and the pair of sidewalls that define the air passage between the bottom wall and the pair of sidewalls and the chassis.

(3) The duct member may include an inlet for air intake to the air passage and an outlet for air exhaust from the air passage. Each of the inlet and the outlet opens to outside along a wall surface of the bottom wall. With this configuration, heat from the dissipative light source attachment portion is dissipated through air that flows through the inlet into the air passage can remove. The air through which the heat dissipates from the dissipative light source attachment portion flows to the outside through the outlet. Each of the inlet and the outlet is formed so as to open to the outside along the wall surface of the bottom wall of the duct member. If the inlets and outlets are formed in the bottom wall, a space for air intake and air exhaust is not required behind the lighting device. However, with the above configuration, such a space is not required or such a space is reduced.

(4) At least one of the inlet and the outlet is provided to each sidewall of the at least a pair of sidewalls so as to be displaced from each other in a direction along the wall surface of the bottom wall. Compared to a configuration that at least one of the inlet and the outlet is provided in each sidewall of the at least a pair of sidewalls such that the inlets or the outlets are opposed to each other in the direction along the wall surface of the bottom wall, decrease in strength of the duct member that may be caused by forming inlets or outlets is less likely to occur.

(5) The duct member may cover a part of the chassis. The lighting device may further include a light source drive board attached to the chassis. The light source drive board is located on the side of the chassis that is opposite to the light exit portion side and adjacent to the duct member. The light source drive board may be configured to provide drive power to the light source. In this configuration, the light source drive board is located on the side of the chassis opposite to the light exit portion side and adjacent to the duct member. Therefore, a thickness of the lighting device can be reduced compared with a case in which the light source drive board is attached to a surface of the duct member opposite to a chassis side.

(6) The duct member may include a bottom wall and at least a pair of sidewalls. The bottom wall may be opposite the chassis. The sidewalls may protrude from the bottom wall toward the chassis and face each other. The air passage may be a space surrounded and defined by the bottom wall, the at least a pair of sidewalls, and the chassis. One of the sidewalls located adjacent to the light source drive board may include an inlet that opens to outside along a wall surface of the bottom wall. The inlet may be displaced from the light source drive board along the wall surface of the bottom wall. With this configuration, heat is dissipated from the dissipative light source attachment portion through air that flows into the air passage through the inlet that is provided in the sidewall included in the duct member. One of the sidewall adjacent to the light source drive board includes the inlet that is displaced from the light source drive board along the wall surface direction of the bottom wall portion. Therefore, even when the light source drive board provides drive power to the light source and the light source generates heat, relatively low-temperature air flows to the air passage through the inlet. Accordingly, sufficient heat dissipation performance can be obtained. Further, the chassis can be reinforced by the duct member.

(7) The light source may include a plurality of light sources. The dissipative light source attachment portion may extend along the end portion of the chassis and the light sources are mounted on the dissipative light source attachment portion so as to be arranged in an extending direction of the dissipative light source attachment portion. The air passage of the duct member is provided in the extending direction of the dissipative light source attachment portion. In this configuration, the light sources are arranged in the extending direction of the dissipative light source attachment portion. Therefore, heat generated by the light sources is efficiently dissipated through air that flows in the air passage extending in the extending direction of the dissipative light source attachment portion. Accordingly, sufficient heat dissipation performance can be obtained.

(8) The duct member may include a first duct portion and a second duct portion. The first duct portion may extend along the extending direction of the dissipative light source attachment portion and include the dissipative light source attachment portion. The second duct portion may extend in a direction across the extending direction of the dissipative light source attachment portion. The second duct portion may be connected to the first duct portion. The lighting device may further include a blower mounted to the second duct portion. The blower may include a blowing port opposite a part of the dissipative light source attachment portion and through which air flows to the air passage. In this configuration, the duct member includes the first duct portion that extends along the extending direction of the dissipative light source attachment portion. The second duct portion extends along the direction across the extending direction of the dissipative light source attachment portion and connected to the first duct portion. This increases mechanical strength of the duct member and also reinforces the chassis to which the duct member is attached. Further, the blower is attached on the second duct portion and air that flows to the air passage through the blowing port of the blower efficiently hits a part of the dissipative light source attachment portion of the first duct portion that faces the blowing port. Therefore, heat generated from the light source is efficiently dispersed with the air.

(9) The chassis may include a bottom plate and a fixing piece. The bottom plate may be located on a side of the chassis that is opposite to the light exit portion side of the chassis and define the air passage between the bottom plate and the duct member. The fixing piece may protrude from the bottom plate toward the side opposite to the light exit portion side so as to be parallel to the dissipation light source attachment portion. The fixing piece may be fixed to the dissipative light source attachment portion. The fixing piece may face the air passage and may be located opposite the blowing port of the blower. With this configuration, by fixing the fixing piece, which protrudes from the bottom plate of the chassis, to the dissipative light source attachment portion, the chassis and the duct member can be fixed. Air that flows through the blowing port of the blower hits the fixing piece that faces the air passage and is located opposite the blowing port. Therefore, a part of the dissipative light source attachment portion (a portion to which the fixing piece is attached) which faces the blowing port is less likely to be locally cooled down. Accordingly, the dissipative light source attachment portion can be evenly cooled down over the extending direction.

(10) The second duct portion may include a pair of second duct portions opposite to each other and may be connected to the first duct portion apart from each other in a direction in which the first duct portion extends. The lighting device may further includes a light source drive board that provided on the side of the chassis opposite to the light exit portion side and located between the pair of second duct portions. The light source drive board may be configured provide drive power to the light source. With this configuration, the blower that is attached to each of the second duct portions blows air and a part of the dissipative light source attachment portion of the first duct portion can be efficiently cooled down. Further, the light source drive board is arranged on the side of the chassis that is opposite to the light exit portion side and located between the pair of the second duct portions. Therefore, the thickness of the lighting device can be reduced and the light source drive board can be protected by the pair of the second duct portions.

(11) The dissipative light source attachment portion of the first duct portion may include an outlet at a position between the pair of the second duct portions. The outlet may open to outside through which air in the air passage exits. In this configuration, the dissipative light source attachment portion includes the outlet that opens to the outside at a position between the pair of the second duct portions. The blower is attached to each of the second duct portions. Air that is blown by the blower to the first duct portion efficiently exits to the outside through the outlet. Accordingly, air-flow properties inside the air passage improve and thus heat dissipation properties improve.

(12) The dissipative light source attachment portion may include a pair of dissipative light source attachment portions and the first duct portion includes a pair of first duct portions. Each of the dissipative light source attachment portions and each of the first duct portions may extends along end the portion of the chassis. Each end of the second duct portion may be connected to each of the pair of the first duct portions. In this configuration, the first duct portions extend along the respective end portions of the chassis and the end portions of the second duct portion are connected to the first duct portions. Therefore, the duct member can have high mechanical strength, and accordingly the chassis to which the duct member is attached is reinforced.

Next, to solve the above problem, a display device according to this invention may include the above-described lighting device and a display panel configured to provide display using light from the lighting device.

According to such a display device, because the lighting device that provides light to the display panel can have improved heat dissipation properties, brightness of light emission can be improved by increasing output of the light sources. Accordingly, high quality display can be achieved.

The display panel may be a liquid crystal panel. The display device as a liquid crystal display device has a variety of applications, such as a television display or a personal-computer display. In particular, it is suitable for a large screen display.

Advantageous Effect of the Invention

According to this invention, heat dissipation properties can be improved.

BRIEF DESCRIPTION OF THE DRAWINGS

FIG. 1 is an exploded perspective view illustrating a general configuration of a television device according to a first embodiment of this invention.

FIG. 23 is a bottom view illustrating an arrangement configuration of a chassis, a duct member, and boards.

FIG. 24 is a plan view illustrating an arrangement configuration of duct members, LED boards, and fans according to a ninth embodiment of this invention.

FIG. 25 is a cross-sectional view taken along line xxv-xxv of FIG. 24.

MODE FOR CARRYING OUT THE INVENTION

First Embodiment

A first embodiment of this invention will be described with reference to FIGS. 1 to 8. In this description, a liquid crystal display device 10 will be described. X-axis, Y-axis and Z-axis are present in some drawings. The axes in each drawing correspond to the respective axes in other drawings. Upper sides and lower sides in FIGS. 6 and 7 correspond to a front side and a rear side, respectively.

Figure 2:
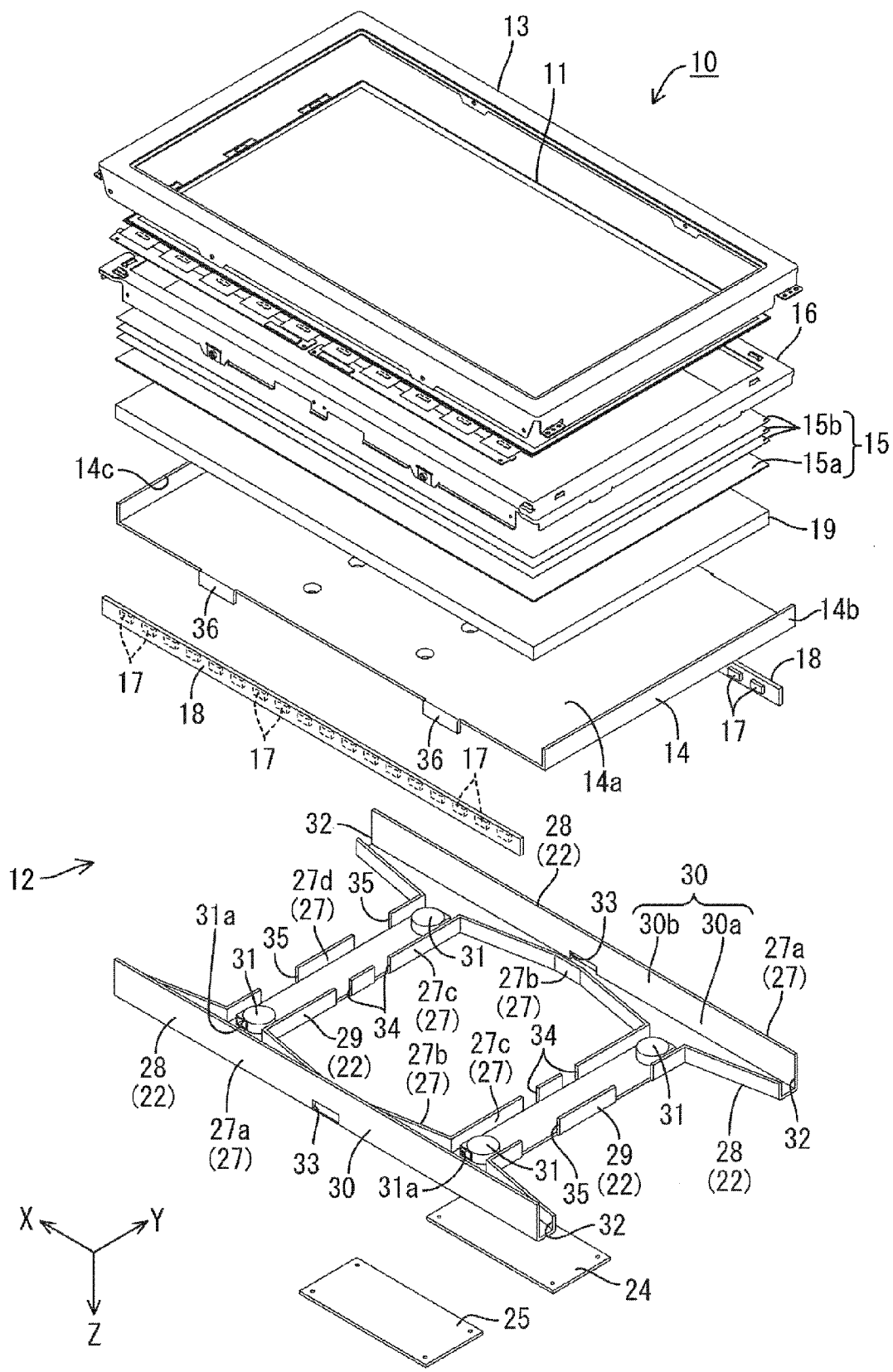
FIG. 2 is an exploded perspective view illustrating a general configuration of a liquid crystal display device.

As illustrated in FIG. 1, a television device TV includes the liquid crystal display device 10, front and rear cabinets Ca and Cb that hold the liquid crystal display device 10 therebetween, a power source P, a tuner T, and a stand S. An overall shape of the liquid crystal display device (a display device) 10 is a landscape rectangular. The liquid crystal display device 10 is held in a vertical position. As illustrated in FIG. 2, the liquid crystal display device 10 includes a liquid crystal panel 11 as a display panel and a backlight unit (a lighting device) 12. The liquid crystal panel 11 and the backlight unit 12 are held with a bezel 13 having a frame-like shape.

As illustrated in FIG. 2, the liquid crystal panel has a landscape rectangular shape (rectangular and longitudinal) in a plan view and includes a pair of glass substrates 11a and 11b and liquid crystals. The substrates 11a and 11b each having high light transmissivity are bonded together with a predetermined gap therebetween. The liquid crystals are sealed between the substrates 11a and 11b. On one of the substrates, switching components (e.g., TFTs), pixel electrodes, and an alignment film are arranged. The switching components are connected to source lines and gate lines that are perpendicular to each other. The pixel electrodes are connected to the switching components. On the other substrate, a color filter, counter electrodes, and an alignment film are arranged. The color filter has color sections such as R (red), G (green) and B (blue) color sections that are arranged in a predetermined pattern. Polarizing plates are arranged on outer sides of the substrates.

As illustrated in FIG. 2, the backlight unit 12 includes a chassis 14 and an optical member 15. The chassis 14 has a light exit portion 14c that opens to the front side (a light exit side, a liquid crystal panel 11 side). The optical member 15 covers the light exit portion 14c. The chassis 14 holds LEDs (Light Emitting Diodes) 17 as light sources, LED boards 18 on each which the LEDs 17 are mounted, a light guide plate (a light guide member) 19, and a frame (a holding member) 16. The light guide plate 19 is configured to guide light from the LEDs 17 toward the front side, i.e., toward a light exit portion 14c side (an optical member 15 side, the liquid crystal panel 11 side). The frame 16 presses the light guide plate 19 and the optical member 15 from the front side. A duct member 22, an LED drive board (a light source drive board) 24, and a control board 25 are attached on a rear side outer portion of the chassis 14. The duct member 22 has an air passage (air through path, air blowing paths) 23 to dissipate heat from the LEDs 17. The LED drive board 24 is configured to supply driving power to the LEDs 17. The control board 25 is configured to send signals to the liquid crystal panel 11 to drive liquid crystals. The backlight unit 12 is an edge-type backlight unit (or side-light type) and includes the LED boards 18 and the light guide plate 19. Each of the LED boards 18 having the LEDs 17 is disposed in each long-side end portion of the backlight unit 12. The light guide plate 19 is disposed at an inner area of the backlight unit 12 between the LED boards 18. Hereinafter, components of the backlight unit 12 will be described in detail.

Figure 3:
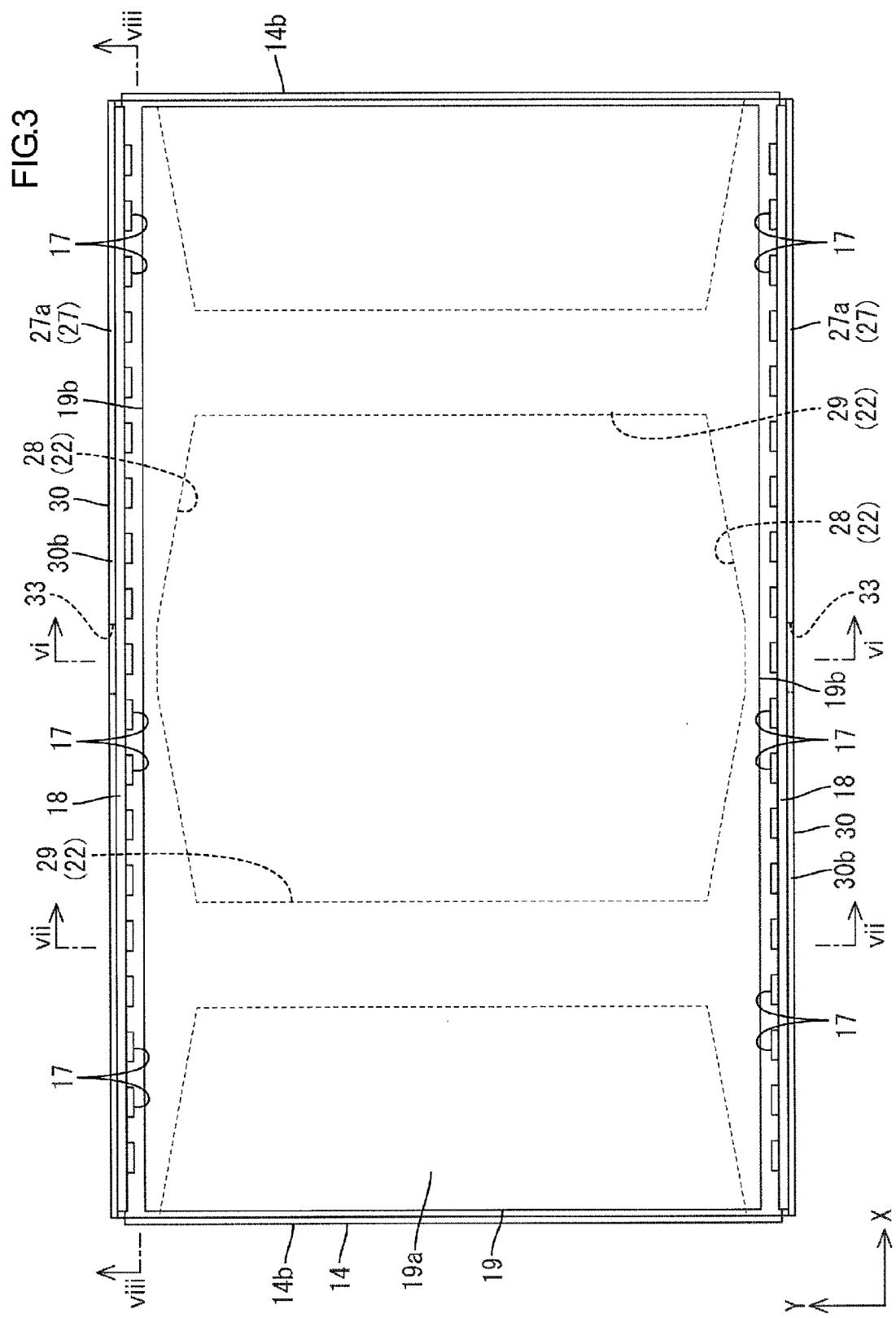
FIG. 3 is a plan view illustrating an arrangement configuration of a chassis, a duct member, a light guide plate, and LED boards in a backlight unit included the liquid crystal display device.

The chassis 14 is made of a metal plate such as an aluminum plate and an electrolytic zinc-coated steel sheet (SECC). As illustrated in FIGS. 2 and 3, the chassis 14 has a landscape rectangular shape in a plan view, similar to the liquid crystal panel 11. A long-side direction and a short-side direction of the chassis 14 correspond to the X-axis direction (the horizontal direction) and the Y-axis direction (the vertical direction), respectively. The chassis 14 is opposite aback side of the light guide plate 19. The chassis 14 includes a bottom plate 14a and a pair of side plates 14b. The bottom plate 14a receives the light guide plate 19. Each of the side plates 14b protrudes from each short-side end portion of the bottom plate 14a toward the front side. The light guide plate 19 is sandwiched between the side plates 14b in the chassis 14. The bottom plate 14a has a plate-like shape extending in the X-axis and the Y-axis. Each of the side plate 14b has a plate-like shape extending in the Y-axis direction and the Z-axis direction. The frame 16 and the bezel 13 can be fixed to the side plate 14b with screws.

Figure 6:
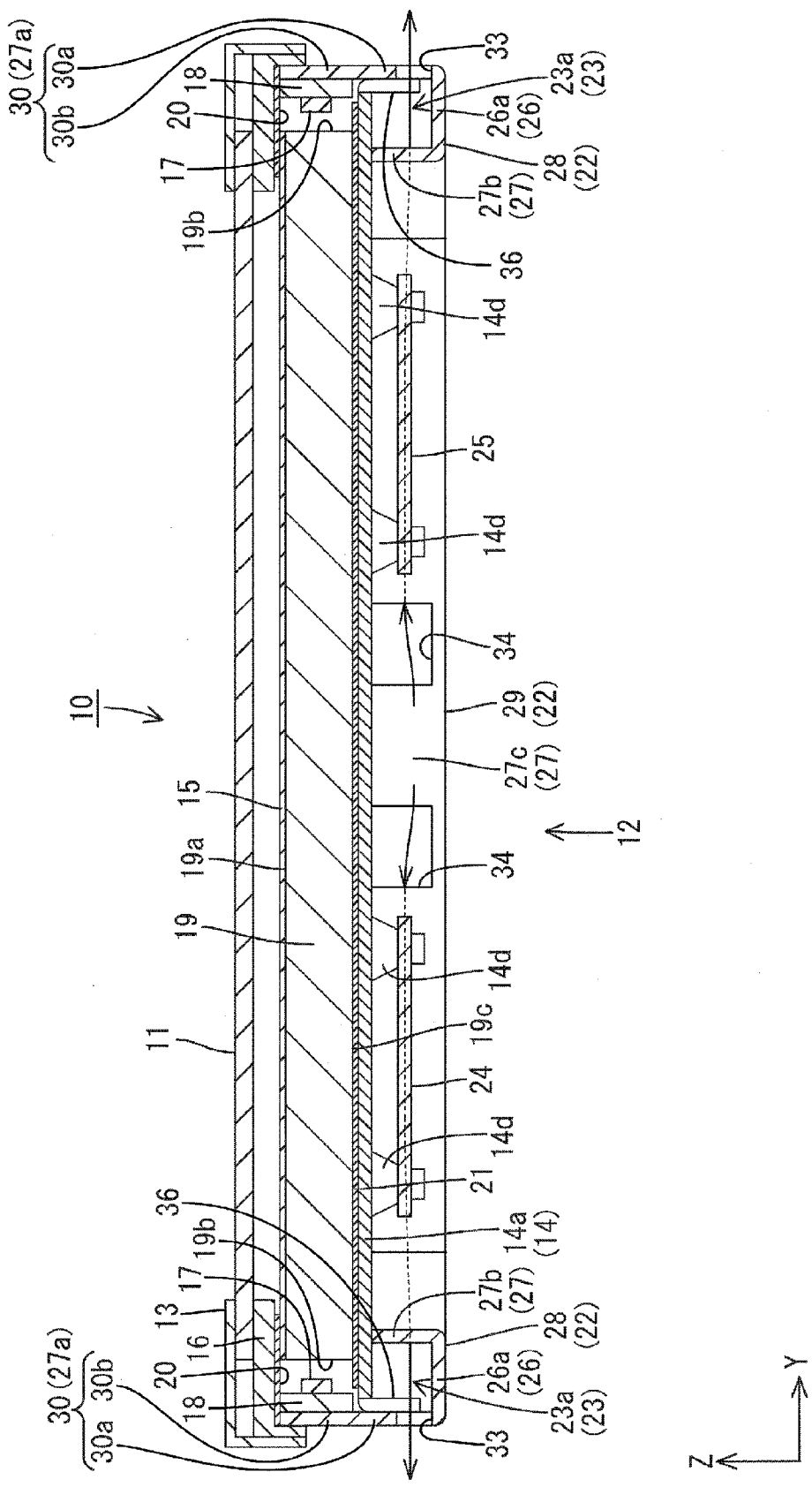
FIG. 6 is a cross-sectional view taken along line vi-vi of FIGS. 3 and 4.

As illustrated in FIG. 2, similar to the liquid crystal panel 11 and the chassis 14, the optical member 15 has a landscape rectangular shape in a plan view. The optical member 15 is placed on a front surface (a light exit side surface) of the light guide plate 19 and located between the liquid crystal panel 11 and the light guide plate 19. The optical member 15 includes a diffuser plate 15a arranged on the rear side and optical sheets 15b arranged on the front side. The diffuser plate 15a includes a plate-like base having a predetermined thickness. The base is made of substantially transparent synthetic resin with light-scattering particles dispersed therein. Light is diffused by the diffuser plate 15a while passing therethrough. Each optical sheet 15b has a sheet-like shape with a thickness smaller than that of the diffuser plate 15a. Three sheets are overlaid with each other. Each of the optical sheets 15b may be any one selected from a diffuser sheet, a lens sheet, and a reflecting type polarizing sheet. In FIG. 6, the optical member 15 is simplified.

As illustrated in FIG. 2, the frame 16 has a frame shape extending along outer edge portions of the optical member 15 and the light guide plate 19. The frame 16 is opposite the outer edge portions of the optical member 15 and the light guide plate 19 so as to hold down substantially entire edges of the optical member 15 and the light guide plate 19 from the front side. The frame 16 is made of synthetic resin. The front surface of the frame 16 may be colored in black so as to have light blocking properties. As illustrated in FIG. 6, first reflection sheets 20 that reflect light are attached on a rear surface of respective long-side portions of the frame 16, i.e. a surface opposite the light guide plate 19 and the LED board 18 (the LEDs 17). Each of the first reflection sheets 20 extends over substantially an entire length of the long-side portion of the frame 16. The first reflection sheet 20 covers corresponding end portions on an LED 17 side of the light guide plate 19 and the LED board 18 from the front side together. The frame 16 receives outer edge portions of the liquid crystal panel 11 from the rear side.

As illustrated in FIGS. 3 and 6, each of the LEDs 17 includes an LED chip that is arranged on a board fixed on the LED board 18 and sealed with resin. The LED chip mounted on the board has one main light emission wavelength. Specifically, the LED chip that emits light in a single color of blue is used. The resin that reals the LED chip contains phosphors dispersed therein. The phosphors emit light in a predetermined color when excited by blue light emitted from the LED chip. Thus, overall color of light emitted from the LED 17 is while. The phosphors may be selected, as appropriate, from yellow phosphors that emit yellow light, green phosphors that emit green light, and red phosphors that emit red light. The phosphors may be used in combination of the above phosphors. The LED 17 includes a light-emitting surface that is opposite from a surface of the LED 17 on which the LED board 18 is mounted. Namely, the LED 17 is a top-surface-emitting type LED.

As illustrated in FIGS. 2, 3, and 6, each LED board 18 has an elongated plate-like shape extending in a long-side direction of the chassis 14 (the X-axis direction, a long-side direction of a light entrance surface 19b of the light guide plate 19). The LED board 18 is arranged in the chassis 14 such that plate surfaces of the LED board 18 are parallel to the X-Z plane, i.e., perpendicular to plate surfaces of the liquid crystal panel 11 and the light guide plate 19 (the optical member 15). The LED board 18 includes a mount surface on which the LEDs 17 are surface-mounted. The mount surface is a plate surface that faces an inner side, namely, a surface of the LED board 18 that faces the light guide plate 19 (the surface opposite the light guide plate 19). The LEDs 17 are apart from each other and arranged in line (i.e., linearly) on the mount surface of the LED board 18 along the long-side direction of the LED board 18 (the X-axis direction). In other words, multiple LEDs 17 are arranged at intervals in each of the long-side end portions of the backlight unit 12 along the long-side direction. Distances between the adjacent LEDs 17 in the X-axis direction are substantially equal, that is, the LEDs 17 are arranged at substantially equal intervals. An arrangement direction of the LEDs 17 corresponds to a longitudinal direction of the LED board 18 (the X-axis direction).

A metal-film trace (not illustrated), such as copper-foil trace, is formed on the mount surface of each LED board 18. The metal-film trace extends in the X-axis direction and crosses over a group of the LEDs so as to connect the adjacent LEDs 17 in series. Terminals at ends of each trace are connected to an external LED drive circuit board (not illustrated). Thus, driving power is supplied to the LEDs 17. The LED boards 18 in pairs that are arranged in the chassis 14 such that the mount surface of each LED board 18 on which the LEDs 17 are mounted are opposite to each other. The light-emitting-surface of each LED on one of the LED boards 18 is opposite the light-emitting-surface of the corresponding LED 17 on the other LED board 18. A light axis of each LED 17 substantially corresponds to the Y-axis direction. In other words, the LEDs 17 on each LED board 18 is arranged opposite the corresponding end portion of the light guide plate 19 in the Y-axis direction (a long-side end portion). A base member of each LED board 18 is made of metal, similar to the chassis 14. The traces (not illustrated) are formed on the surface of the LED board 18 with an insulating layer in between. A material used for the LED board 18 may be an insulating material such as ceramic.

The light guide plate 19 is made of substantially transparent (high transmissivity) synthetic resin (e.g. acrylic resin or polycarbonate such as PMMA) that has a refractive index sufficiently higher than that of the air. As illustrated in FIG. 2, the light guide plate 19 has a landscape rectangular shape in a plan view similar to the liquid crystal panel 11 and the chassis 14. The light guide plate 19 has a thickness that is larger than that of the light guide plate 19. A long-side direction and a short-side direction of the plate surface of the light guide plate 19 correspond to the X-axis direction and the Y-axis direction, respectively. A thickness direction of the light guide plate 19 that is perpendicular to the surface of the light guide plate 19 corresponds to the Z-axis direction. As illustrated in FIG. 6, the light guide plate 19 is arranged right behind the liquid crystal panel 11 and the optical member 15 in the chassis 14 and located between the LED boards 18 arranged in the long-side edges of the chassis 14 in the Y-axis direction. Namely, an arrangement direction between the LEDs 17 (or the LED board 18) and the light guide plate 19 corresponds to the Y-axis direction. An arrangement direction between the optical member 15 (or the liquid crystal panel 11) and the light guide plate 19 corresponds to the Z-axis direction. The both arrangement directions are perpendicular to each other. The light guide plate 19 is configured to guide the light, which is emitted from the LEDs 17 in the Y-axis direction and enters the light guide plate 19, toward the optical member 15 (on the front side).

The light guide plate 19 has a plate-like shape extending along plate surfaces of the bottom plate 14a of the chassis 14 and the optical member 15. Plate surfaces of the light guide plate 19 are parallel to the X-Y plane. One of the plate surfaces (a surface opposite the optical member 15) of the light guide plate 19 on the front side is a light exit surface 19a. Light that is inside the light guide plate 19 exits through the light exit surface 19a toward the optical member 15 and the liquid crystal panel 11. The light guide plate 19 includes outer peripheral surfaces that are adjacent to the plate surfaces thereof. Among the outer peripheral surfaces, each long-side surface having a shape elongated along the X-axis direction is opposite the corresponding LEDs 17 (or the LED board 18) with a predetermined space therebetween. The long-side surfaces are light entrance surfaces 19b through each of which light emitted by the LEDs 17 enters the light guide plate 19. Each of the light entrance surfaces 19b is parallel to the X-axis direction (the arrangement direction of the LEDs 17) and the Z-axis direction. In other words, the light entrance surface 19b is parallel to a main plate surface of the LED board 18, and substantially perpendicular to the light exit surface 19a. An arrangement direction between the LEDs 17 and the light entrance surfaces 19b corresponds to the Y-axis direction, and parallel to the light exit surface 19b.

One of the plate surfaces of the light guide plate 19 on the rear side is a plate surface 19c that is opposite from the light exit surface 19a. A second reflection sheet 21 covers an entire area of the plate surface 19c. A part of light passing through the light guide plate 19 is reflected by the second reflection sheet 21 toward the front side. The second reflection sheet 21 has long-side end portions that extend outward from the respective light entrance surfaces 19b of the light guide plate 19. Each of the extended long-side end portions faces the corresponding first reflection sheet 20 from the rear side. Between the first reflection sheet 20 and the corresponding extended long-side end portion of the second reflection sheet 21, the LEDs 17 and the light entrance surface 19b are disposed with a space between each other. The space is between the first reflection sheet 20 and the extended long-side end portion of the second reflection sheet 21. Therefore, light that travels from the LEDs 17 toward the light entrance surface 19b is repeatedly reflected by the first reflection sheet 20 and the second reflection sheet 21, and thus the light efficiently enters the light guide plate 19. At least one of the light exit surface 19a and the plate surface 19c opposite to the light exit surface 19a of the light guide plate 19 has a reflection portion (not illustrated) or a scattering portion (not illustrated). The reflection portion is configured to reflect the light in the light guide plate 19. The scattering portion (not illustrated) is configured to scatter the light in the light guide plate 19. The reflection portion or the scattering portion may be formed by patterning so as to have a specified in-plane distribution. This configuration regulates the light from the light exit surface 19a to have an even in-plane distribution.

Figure 5:
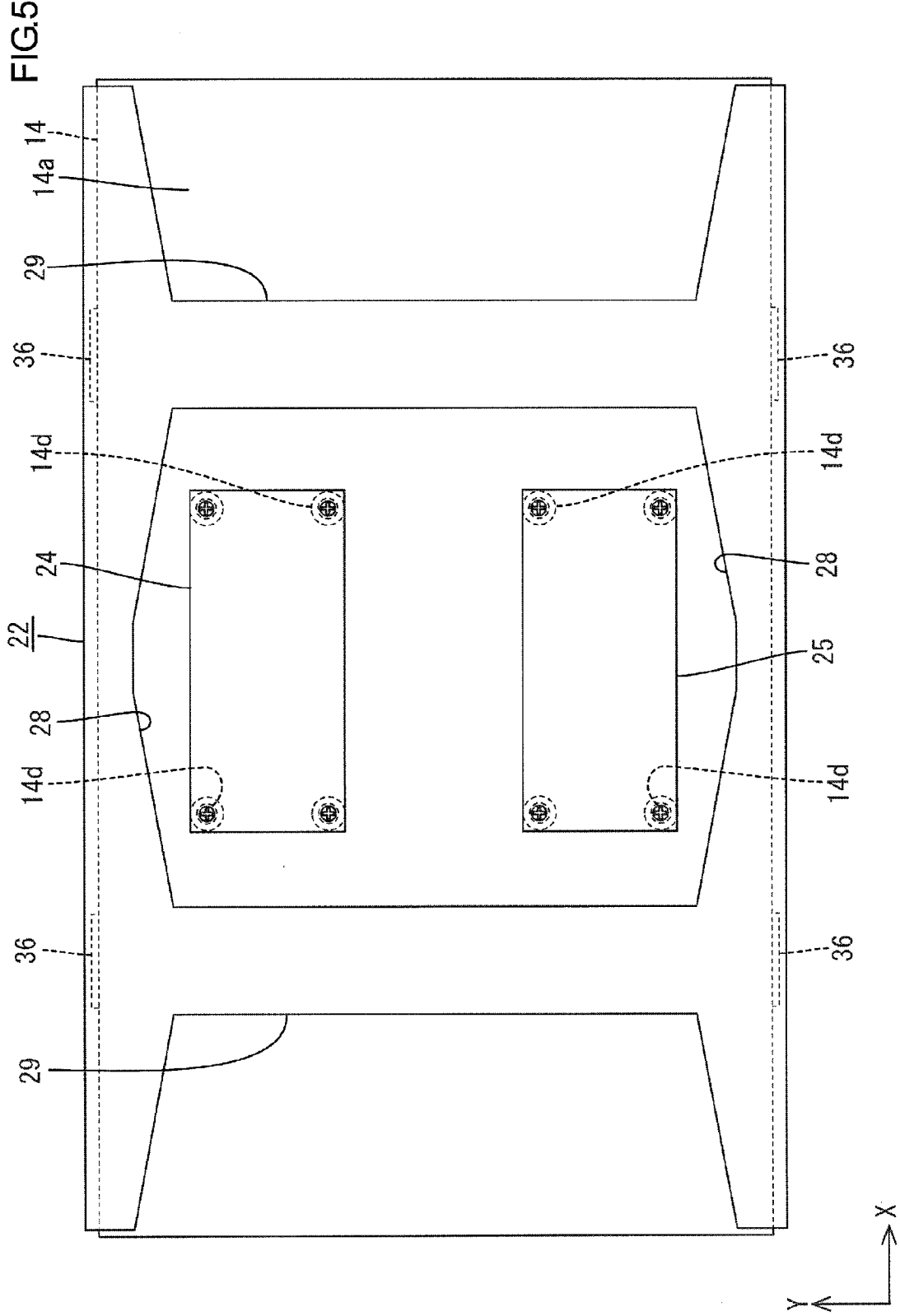
FIG. 5 is a bottom view illustrating an arrangement configuration of the chassis, the duct member, and boards in the backlight unit.

Next, the LED drive board 24, the control board 25, and the duct member 22 that are attached on the rear side outer portion of the chassis 14 will be described in detail. The LED drive board 24 includes a board that is made of a synthetic resin (a phenolic paper or a glass epoxy resin, for example). A circuit pattern is formed on the board and electric components are mounted thereon. As illustrated in FIGS. 2, 5, and 6, the LED drive board 24 is connected to the LED boards 18 disposed inside the chassis 14 and the power source P (see FIG. 1) disposed outside the chassis 14 via electric wires or flexible boards. The LED drive board 24 is configured to control turning on and off of the LEDs 17 mounted on the LED boards 18 by supplying driving voltages received from the power source P to the LEDs 17. The control board 25 includes a board that is made of a synthetic resin (a phenolic paper or a glass epoxy resin, for example) with a circuit pattern thereon. The control board 25 is configured to convert television signals, which are sent from the tuner T, to driving signals for liquid crystals, and supply the driving signals to the liquid crystal panel 11. The control board 25 is connected to the liquid crystal panel 11 via flexible boards on which drivers for driving liquid crystals are mounted (not illustrated). The LED drive board 24 and the control board 25 are located in a substantially middle area of the bottom plate 14a of the chassis 14 in the long-side direction and the short-side direction. The LED drive board 24 and the control board 25 are arranged adjacent to each other in the short-side direction. The bottom plate 14a of the chassis 14 includes mount bases 14d that project from a part of the bottom plate 14a toward the rear side. The LED drive board 24 and the control board 25 are attached to the mount bases 14d with screws.

Figure 4:
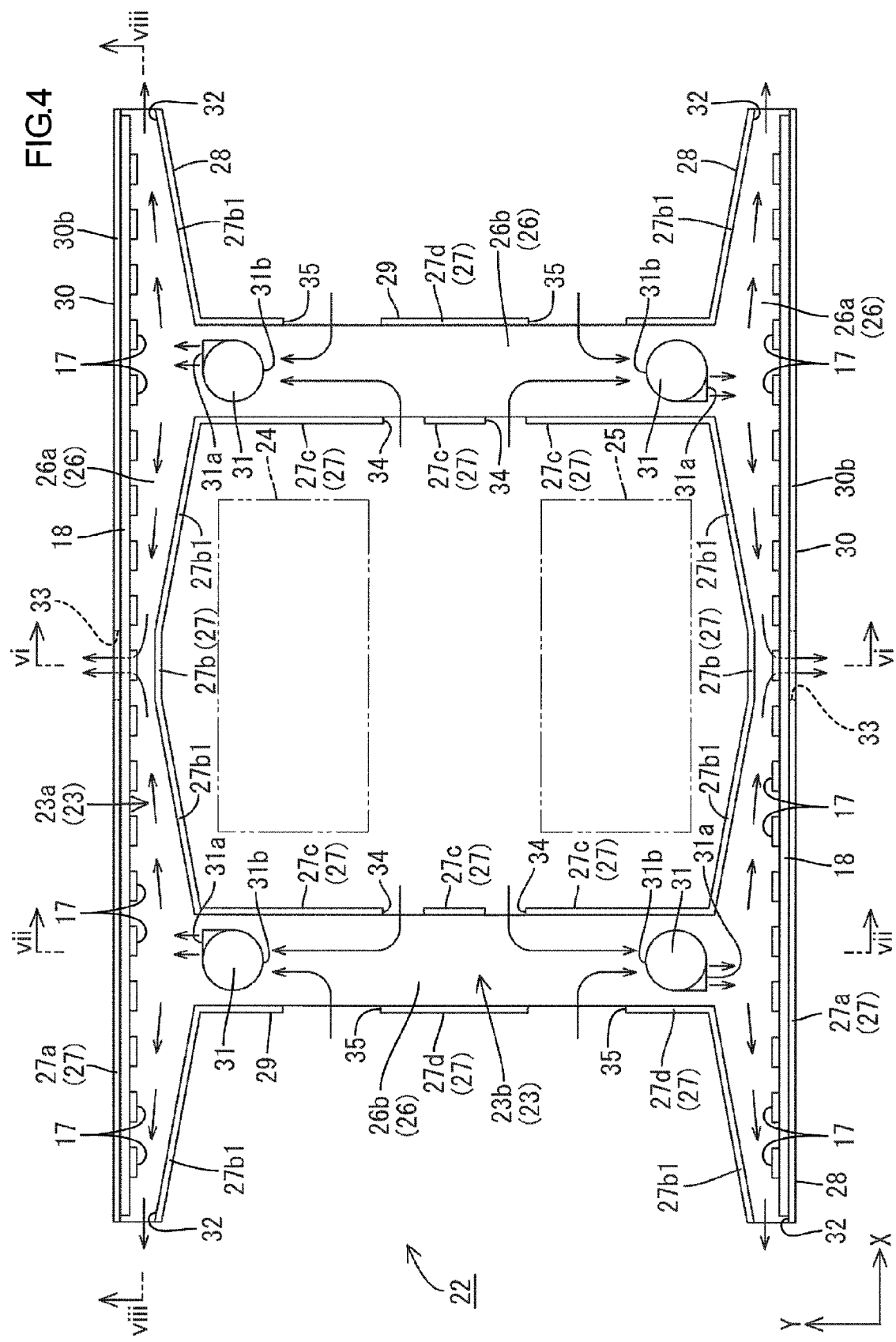
FIG. 4 is a plan view illustrating an arrangement configuration of the duct member, the LED boards, and fans in the backlight unit.

Next, the duct member 22 will be described. The duct member 22 is formed by pressing a plate made of metal (e.g. aluminum or iron). As illustrated in FIGS. 2 and 4, the duct member 22 has a substantially ladder shape as a whole in a plan view. Further, the duct member 22 has a substantially hollow shape with an opening on the front side such that the duct member 22 has an air passage 23 between the duct member 22 and the chassis 14. The duct member 22 includes a bottom wall 26 and sidewalls 27. The bottom wall 26 is parallel to the bottom plate 14a of the chassis 14 and has a substantially ladder shape in a plan view. The sidewalls 27 that project from respective outer peripheral edges of the bottom wall 26 toward the front side are arranged opposite to each other in pairs. A space that is surrounded and defined by the bottom wall 26, the sidewalls 27, and the bottom plate 14a of the chassis 14 is the air passage 23. The duct member 22 having such a configuration is mounted on the back surface side of the chassis 14, and thus the chassis 14 is strengthened. Further, with the air passage 23 provided between the duct member 22 and the chassis 14, air that flows through the air passage 23 is less likely to leak into a space within the chassis 14 and dust that may exist in the air passage 23 is less likely to penetrate into the space within the chassis 14. With this configuration, the dust is less likely to be attached to the light guide plate 19 or the LEDs 17 and thus sufficient optical performance can be exerted.

As illustrated in FIGS. 2 and 4, the duct member 22 includes a pair of first duct portions 28 and a pair of second duct portions 29. The first duct portions 28 extend along the long-side direction (the X-axis direction, a longitudinal direction of the LED board 18) of the chassis 14. The second duct portions 29 extend along the short-side direction (the Y-axis direction, a direction perpendicular to a direction in which the first duct portion 28 extends) of the chassis 14. Fans (blowers) 31 are disposed in each of the second duct portions 29. Each second duct portion 29 has end portions with respect to an extending direction thereof. Each of the end portions is connected to an intermediate portion of the corresponding first duct portion 28 with respect to an extending direction thereof. When the fans 31 mounted in the second duct portion 29 blow air inside the air passage 23, the air flows from the second duct portion 29 toward the first duct portions 28. Namely, the second duct portion 29 is an upstream side and the first duct portion 28 is a downstream side. In each of FIGS. 4 and 6 to 8, airflow directions in the air passage 23 are indicated by arrows. The bottom wall 26 of the duct member 22 includes first bottom wall portions 26a included in the first duct portions 28 and second bottom wall portions 26b included in the second duct portions 29. The sidewalls 27 include a pair of first sidewall portions 27a and 27b included in the first duct portion 28 and a pair of second sidewall portions 27c and 27d included in the second duct portion 29. The air passage 23 in the duct member 22 includes first air passages 23a in the first duct portions 28 and second air passages 23b in the second duct portions 29.

As illustrated in FIGS. 4 and 5, the first duct portion 28 covers an end portion of the chassis 14 extending in the long-side direction of the chassis 14 from the rear side. The first duct portion 28 extends over substantially an entire length of the long-side end portion. The first duct portion 28 has edge-side outlets 32 at respective ends with respect to a long-side direction thereof. Each of the edge-side outlets 32 opens to the outside so that air in the corresponding first air passage 23a exits therethrough. The first duct portion 28 includes the first bottom wall portion 26a and the first sidewall portions 27a and 27b. The first bottom wall portion 26a has an elongated shape extending along the long-side direction of the chassis 14. The first sidewall portions 27a and 27b protrude from end portions of the first bottom wall portion 26a along an extending direction (the X-axis direction) of the first bottom wall portion 26a toward the front side. Each first sidewall portion 27a, 27b extends over substantially an entire length of the first bottom wall portion 26a. The first bottom wall portion 26a has an outer end portion along the extending direction thereof that is substantially straight over the entire length. The first sidewall portion 27a on the outer side that is formed along the outer end portion of the first bottom wall portion 26a has a straight shape over the substantially entire length. On the other hand, the first bottom wall portion 26a has an inner end portion along the extending direction and a part of the inner end portion has a tapered shape in a plan view. The first sidewall portion 27b on the inner side that is formed along the inner end portion of the first bottom wall portion 26a has a portion having a tapered shape in a plan view. Specifically, a width of the first bottom wall portion 26a and a distance between the pair of sidewall portions 27a and 27b, that is, a width of the first air passage 23 varies in the length direction (the X-axis direction). The first duct portion 28 has a maximum width in a connection area (a portion through which air flows to the first duct portion 28) with the second duct portion 29 and a width of the first duct portion 28 gradually and continuously reduces as is away from the connection area (as is closer to the outlets 32, 33). Namely, each first side wall portion 27b on the inner side includes tapered portions 27b1 that serve as straightening plates to straighten and smooth the air flow in the first air passage 23a. The first sidewall portion 27b on the inner side has openings to be communicated with the respective second duct portions 29. An opening edge of each opening is connected to the second sidewall portions 27c and 27d. Each of the edge-side outlets 32 opens to the outside at each end of the first duct portion 28 in the X-axis direction, i.e., opens along a wall surface of the corresponding first bottom wall portion 26a. In other words, the edge-side outlet 32 opens to the radially outer side of the duct member 22.

As illustrated in FIGS. 2 and 6, the first sidewall portion 27a on the outer side that protrudes from the first bottom wall portion 26a has a protruding height greater than that of the first sidewall portion 27b on the inner side. The first sidewall portion 27b on the outer side includes an LED attachment portion 30b at a protruded end portion thereof. The LED attachment portion 30b is located on the front side relative to the bottom plate 14a of the chassis 14. The LED board 18 is arranged on the LED attachment portion 30b. The first sidewall portion 27a on the outer side further includes a heat dissipation portion 30a at a protruding base portion thereof. The heat dissipation portion 30a is located on the rear side of the bottom plate 14a of the chassis 14. The heat dissipation portion 30a faces the first air passage 23a so that air that passes through the first air passage 23a cools down the heat dissipation portion 30a. Namely, the first sidewall portion 27a of each first duct portion 28 constitutes a dissipative LED attachment portion 30 including the heat dissipation portion 30a and the LED attachment portion 30b. The heat dissipation portion 30a is located outside the chassis 14 and faces the first air passage 23a. The LED attachment portion 30b protrudes to a space within the chassis 14 and the LEDs 17 are mounted thereon. Accordingly, one pair of the first duct portions 28 includes one pair of the dissipative LED attachment portions 30. The dissipative LED attachment portions 30 are arranged outside the respective ends in the short-side direction of the chassis 14 so as to sandwich the chassis 14 in the short-side direction.

As illustrated in FIGS. 4 and 6, the LED attachment portion 30b of the dissipative LED attachment portion 30 extends over a substantially entire length of the LED board 18 in the X-axis direction. The LED board 18 is attached on an inner wall of the LED attachment portion 30b. The LED attachment portion 30b extends along an arrangement direction in which the multiple LEDs 17 on the LED board 18 are arranged. Therefore, heat generated by the arranged LEDs 17 is efficiently transferred to the LED attachment portion 30b. As illustrated in FIG. 3, the LED attachment portions 30b are arranged on end portions of the chassis 14 along the long-side direction. Since the side plates 14b of the chassis 14 are located on the short-side end portions of the chassis 14, the LED attachment portions 30b and the side plates 14b surround the outer peripheral surfaces of the light guide plate 19. As illustrated in FIGS. 4 and 6, each heat dissipation portion 30a extends along the X-axis direction having the same length as the LED attachment portion 30b. An inner plate surface of the heat dissipation portion 30a faces the first air passage 23a of the first duct portion 28. Therefore, heat is efficiently transferred from the LED attachment portion 30b to the heat dissipation portion 30a. Further, a substantially entire area of the inner plate surface of the heat dissipation portion 30a is subject to the air that passes through the first air passage 23a. Therefore, heat that is generated by the LEDs 17 and transferred from the LED attachment portion 30b is effectively dissipated. The heat dissipation portion 30a and the LED attachment portion 30b continue to each other without any steps. In other words, the dissipative LED attachment portion 30 is a flat plate without any bent portions. The heat dissipation portion 30a of the dissipative LED attachment portion 30 that faces the first air passage 23a has a middle outlet 33. The middle outlet 33 opens to the outside for discharging air in the first air passage 23a to the outside. The middle outlet 33 is at a middle portion of the dissipative LED attachment portion 30 in the long-side direction between the second duct portions 29. Air that flows from the second air passages 23b of the second duct portions 29 to the first air passage 23a of the first duct portion 28 partially flows to the middle side of the first duct portion 28. The air in the middle side of the first duct portion 28 is efficiently exit to the outside through the middle outlet 33. The middle outlet 33 opens to the outside in the Y-axis direction, i.e., opens along the wall surface of the first bottom wall portion 26a, that is, opens to the radially outer side of the duct member 22.

As illustrated in FIG. 5, the second duct portions 29 are band-like portions in pairs that are arranged apart from each other in the long-side direction of the chassis 14. Each of the second duct portions 29 extends along the short-side direction of the chassis 14 and covers substantially an entire short-side length of the chassis 14 from the rear side. End portions of each second duct portion 29 in an extending direction (the Y-axis direction) thereof are connected to the first duct portions 28, respectively. As illustrated in FIG. 4, each of the second duct portions 29 is connected to the intermediate area of the first duct portion 28 that is located between each of the end portions and the middle portion of the first duct portion 28 with respect to the extending direction thereof (the X-axis direction). Therefore, a distance between the second duct portion 29 and the edge-side outlet 32 of the first duct portion 28 substantially equals to a distance between the second duct portion 29 and the middle outlet 33. The second duct portion 29 includes the second bottom wall portion 26b and the pair of second sidewall portions 27c and 27d. The second bottom wall portion 26b has an elongated shape extending along the short-side direction of the chassis 14. The second sidewall portions 27c and 27d extend from end portions along an extending direction (the Y-axis direction) of the second bottom wall portion 26b toward the front side. The second sidewall portions 27c and 27d extend along an entire length of the second bottom wall portion 26b. The second bottom wall portion 26b has a substantially constant width over its entire length. Since the second sidewall portions 27c and 27d are arranged at end portions in the width direction of the second bottom wall portion 26b, each of the second sidewall portions 27c and 27d has a straight shape over its entire length in the extending direction.

Figure 7:
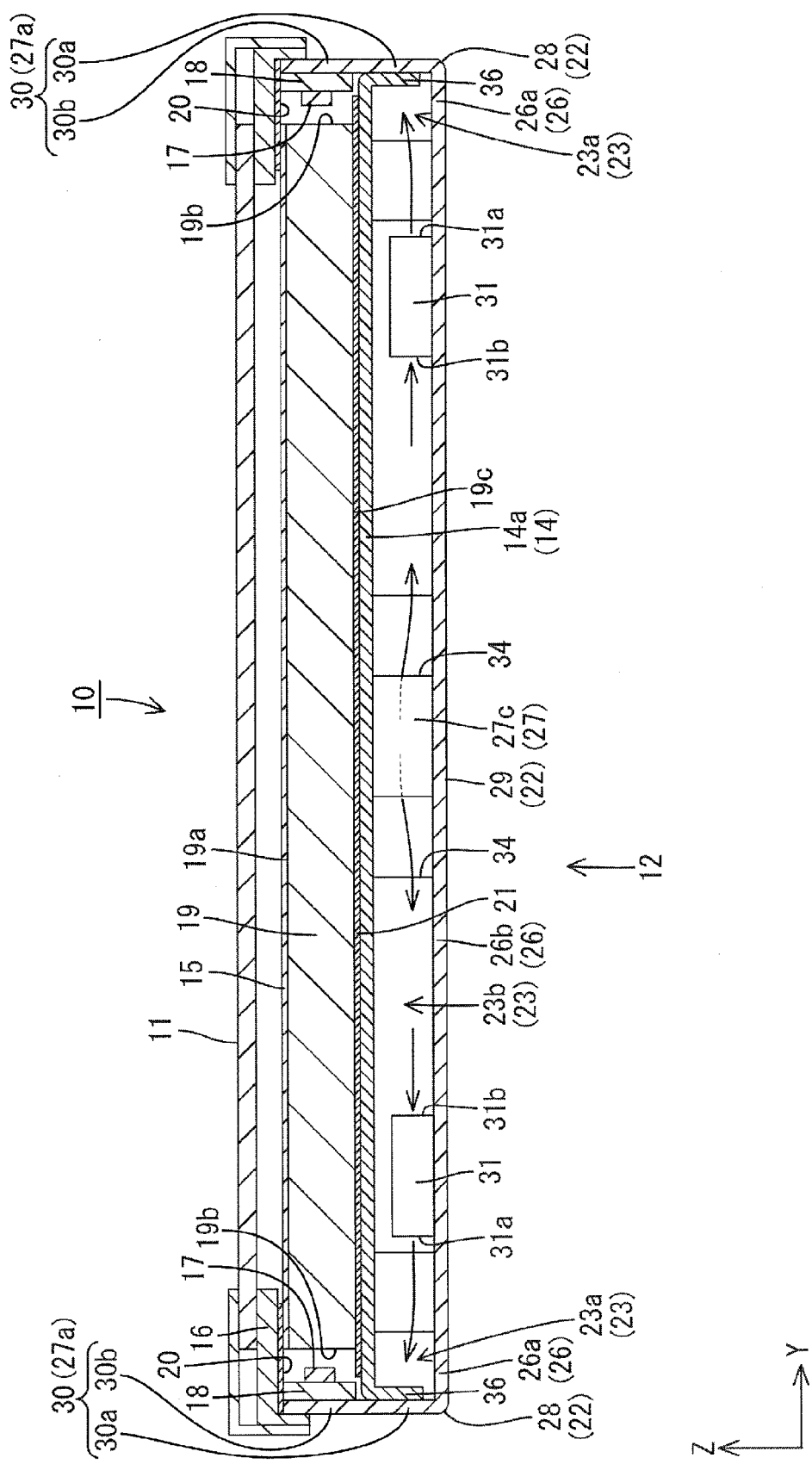
FIG. 7 is a cross-sectional view taken along line vii-vii of FIGS. 3 and 4.

As illustrated in FIGS. 4 and 7, the fans 31 are mounted on the second bottom wall portions 26b of the second duct portions 29. The fans 31 are configured to blow air in the air passage 23 to improve air-flow properties. The fans 31 are symmetrically arranged in pairs at end areas in the longitudinal direction of each second duct portion 29. Specifically, each fan 31 is a multi-blade blower so-called a sirocco fan and includes a fan case (a casing), an impeller, and a motor. The impeller is rotatably disposed inside the fan case. The motor is configured to rotate the impeller. The fan case has a blowing port (an air blow port) 31a through which air blows out and an intake port (a suction port) 31b through which air flows in. The blowing port 31a and the intake port 31b open to opposite directions. The impeller having a substantially cylindrical shape includes multiple vanes (blades) that are arranged along the periphery at substantially the same pitch angle. The motor includes a driving shaft that is connected to the impeller to rotate the impeller at a predetermined speed. Accordingly, the fan 31 takes air therein through the intake port 31b when the motor drives and the impeller rotates, and blows out the air through the blowing port 31a at a predetermined wind pressure (wind volume). The blowing port 31a and the intake port 31b of the fan 31 open to the opposite sides in the Y-axis direction in the second duct portion 29. Specifically, the blowing port 31a faces the first duct portion 28 that is adjacent to the fan 31. The intake port 31b faces a middle portion of the second duct portion 29 with respect to the longitudinal direction thereof. In such an attachment position, because the blowing port 31a of the fan 31 faces heat dissipation portion 30a of the dissipative LED attachment portion 30, air flowing out through the blowing port 31a efficiently hits the heat dissipation portion 30a and promotes heat dissipation.

As illustrated in FIGS. 4 and 7, the pair of second sidewall portions 27c and 27d included in each second duct portion 29 has inlets 34 and 35. Each of the inlets 34 and 35 opens to the outside so that external air flows into the second air passage 23b therethrough. Each inlet 34, 35 is formed in a middle area of the second duct portion 29 that is inward from the ends of the second duct portion 29 with respect to its longitudinal direction (the Y-axis) or that is inward from the fans 31. With such a configuration, the outside air flows into each fan 31 through the intake port 31b. Specifically, each second sidewall portion 27c that is located on the inner side than the corresponding second sidewall portion 27d has a pair of inner inlets 34. Each second sidewall portion 27d that is located on the outer side than the corresponding second sidewall portion 27c has a pair of outer inlets 35. The inner inlets 34 and the outer inlets 35 are displaced (in an offset position) to each other in a longitudinal direction (the Y-axis direction or a direction along the wall surface of the second bottom wall portion 26b) of the second duct portion 29 or the second air passage 23b. With this configuration, the strength of the second duct portion 29, which may be lowered by forming openings such as inlets 34 or 35 in the second duct portion 29, is less likely to be lowered. The inner inlets 34 are located closer to the middle area of the second duct portion 29 than the outer inlets 35 with respect to the longitudinal direction of the second duct portion 29. In other words, the inner inlets 34 are located relatively far from the fans 31. Each inner inlet 34 has an opening width (an opening area) relatively smaller than that of outer inlet 35. The paired inner inlets 34 and the paired outer inlets 35 are respectively arranged at symmetrical positions with respect to a center of the second duct portion 29 in the longitudinal direction. Each of the inlets 34 and 35 opens to the outside in the X-axis direction in the second duct portion 29, that is, along the wall surface of the second bottom wall portion 26*b*. The inner inlets 34 open inward in the radial direction of the duct member 22. The outer inlets 35 open outward in the radial direction of the duct member 22.

As illustrated in FIGS. 2 and 7, the chassis 14 includes fixing pieces 36 to fix the duct member 22 having the above-described configuration and the chassis 14 together. The fixing pieces 36 extend from respective end portions of the bottom plate 14*a* along the long-side direction (the X-axis direction) in the chassis 14 toward the rear side, that is, toward the duct member 22. Each fixing piece 36 is a small plate having landscape rectangular shape in a side view. A plate surface of the fixing piece 36 is parallel to the X-Z plane. In other words, the fixing piece 36 is parallel to the dissipative LED attachment portion 30 (or the first sidewall portion 27*a*). The fixing piece 36 is in surface contact with an inner plate surface of the dissipative LED attachment portion 30, and fixed thereto by welding or screws. The fixing piece 36 that is fixed to the heat dissipation portion 30*a* of the dissipative LED attachment portion 30 faces the first air passage 23*a* of the first duct portion 28. The fixing pieces 36 are arranged in pairs at each long-side end portion of the bottom plate 14*a* in the long-side direction so as to be spaced from each other in the long-side direction. When the duct member 22 is mounted to the chassis 14, each fixing piece 36 overlaps the second duct portion 29 in the X-axis direction. The fixing piece 36 that is fixed to the dissipative LED attachment portion 30 is located in the first air passage 23*a* of the first duct portion 28, and is located on a position straight in front of (opposite) the blowing port 31*a* of the fan 31. In this configuration, air blown from the fan 31 toward the first air passage 23*a* directly hits the fixing piece 36 that is located straight in front of the fan 31. The air is less likely to hit a portion of the heat dissipation portion 30*a* of the dissipative LED attachment portion 30 that is located straight in front of the fan 31. Therefore, the portion of the heat dissipation portion 30*a* is less likely to be locally cooled down.

As illustrated in FIG. 5, since the duct member 22 covers a part of the chassis 14 from the rear side, the chassis 14 includes a ductless area where the duct member 22 is not disposed. In the ductless area, the LED drive board 24 and the control board 25 having the above-described configurations are arranged next to the duct member 22. In other words, each of the LED drive board 24 and the control board 25 is attached to the chassis 14 so as to be adjacent to each other in the X-Y plane without overlaid with the duct member 22 in a front-rear relation in the Z-axis direction. Therefore, the thickness of the backlight unit 12 can be reduced. Specifically, the LED drive board 24 and the control board 25 are arranged in the middle portion of the chassis 14 in the X-axis direction and the Y-axis direction, and sandwiched between the pair of the first duct portions 28 and between the pair of the second duct portions 29. In other words, the LED drive board 24 and the control board 25 are surrounded by the pair of the first duct portions 28 and the pair of the second duct portions 29 that form a frame-like shape (a ring-like shape) as a whole. Further, the duct member 22 protrudes from the chassis 14 toward the rear side further than the LED drive board 24 and the control board 25. Therefore, the pair of the first duct portions 28 and the pair of the second duct portions 29 can protect the LED drive board 24 and the control board 25. Furthermore, the LED drive board 24 and the control board 25 are located in an outer side area (in an offset position) with respect to the inner inlets 34, which is formed in the second sidewall portion 27*c* on the inside of the second duct portion 29, in the Y-axis direction (the direction along the wall surface of the second bottom wall portion 26*b*). Therefore, even if the LED drive board 24 and the control board 25 generate heat, relatively high-temperature air around the LED drive board 24 and the control board 25 is less likely to flow through the inner inlet 34, and relatively low-temperature air flows through the inner inlet 34. This maintains high heat dissipation performance of the dissipative LED attachment portion.

The present embodiment has the above-described structure, and an operation thereof will be described. When the liquid crystal display device 10 having the above-described structure is tuned on, driving of the liquid crystal panel 11 is controlled by a control circuit on the control board 25, and driving of the LED 17 on the LED board 18 is controlled by driving power provided from an LED drive circuit on the LED drive board 24. The light emitted from each LED 17 is guided by the light guide plate 19 and applied to the liquid crystal panel 11 via the optical member 15. As a result, images are displayed on the liquid crystal panel 11. Hereinafter, operations of the backlight unit 12 will be explained.

As illustrated in FIG. 6, when the LED 17 is turned on, light emitted from the LED 17 enters the light guide plate 19 through the light entrance surface 19*b*. The LED 17 and the light entrance surface 19*b* are arranged with a predetermined space therebetween. The space is between the first reflection sheet 20 on the front side and the second reflection sheet 21 on the rear side. Therefore, light from the LED 17 is repeatedly reflected by the both reflection sheets 20 and 21 and thus the light efficiently enters through the light entrance surface 19*b*. The light through the light entrance surface 19*b* is totally reflected by a boundary between the light guide plate 19 and air, or reflected by the second reflection sheet 21 while traveling through the light guide plate 19, and exits through the light exit surface 19*a* toward the optical member 15 on the front side.

Figure 8:
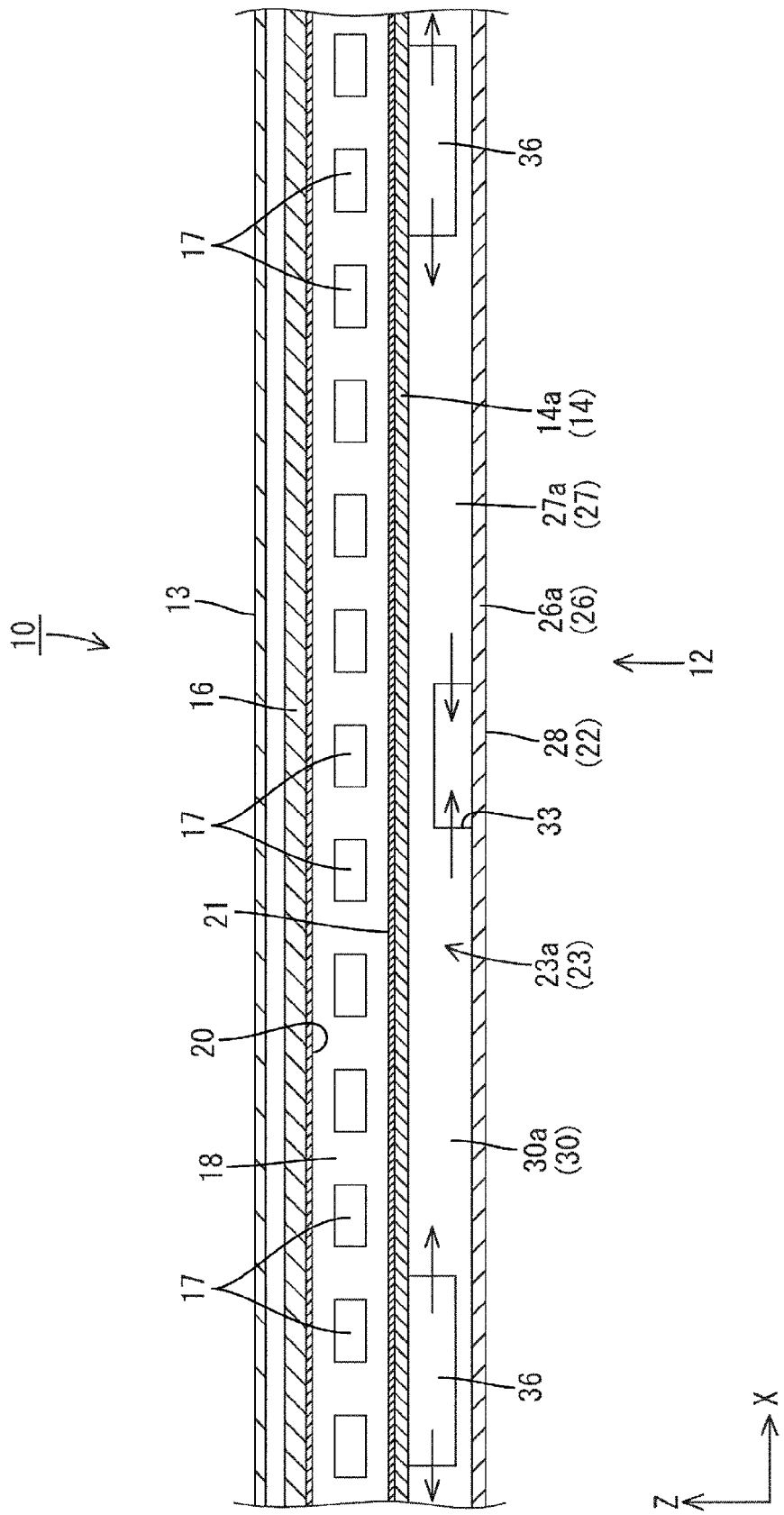
FIG. 8 is a cross-sectional view taken along line viii-viii of FIGS. 3 and 4.

As illustrated in FIGS. 6 to 8, heat generated by light emission of the LEDs 17 is transferred to the LED attachment portion 30*b* of the dissipative LED attachment portion 30 of the duct member 22 via the LED board 18. The heat is transferred to the heat dissipation portion 30*a* on the outside of the chassis 14. Because the heat dissipation portion 30*a* faces the air passage 23 (the first air passage 23*a*) of the duct member 22, the heat transferred to the heat dissipation portion 30*a* dissipates through the air that flows through the air passage 23. Thus, heat from the LEDs 17 dissipates. To accelerate the dissipation of heat from the LEDs 17, fans 31 disposed in the duct member 22 are driven and to forcibly intake and exhaust air through the air passage 23. A temperature sensor (not illustrated) may be disposed in the backlight unit 12 and the fans 31 may be driven only when an environmental temperature reaches a predetermined level. Or else, the fans 31 may be always driven while the liquid crystal display device 10 is powered on. As illustrated in FIG. 4, when the fans 31 are driven, external air is drawn into the second air passage 23*b* through the inlets 34, 35 of the second duct portion 29, and the air is drawn into each fan 31 through the corresponding intake port 31*b*. Each of the inner inlets 34 is arranged offset from the LED drive board 24 and the control board 25. Therefore, even if the LED drive board 24 and the control board 25 are driven and generate heat, relatively low-temperature air is drawn through the inner inlet 34. The air is blown toward the first air passage 23*a* of the first duct portion 28 through the blowing port 31*a*. The air blown to the first air passage 23*a* directly hits each of the fixing pieces 36 of the chassis 14 that is arranged opposite the blowing port 31*a* of each fan 31 (FIG. 7). The fixing piece 36 covers a part of the heat dissipation portion 30a of the dissipative LED attachment portion 30. The covered part of the heat dissipation portion 30a does not directly receive the air from the fan 31. Therefore, the covered part is less likely to be excessively cooled down compared with the other part of the heat dissipation portion 30a. With this configuration, the overall heat dissipation portion 30a is evenly cooled down. The air that hits each fixing piece 36 flows to be branched into two directions along the X-axis direction. The heat dissipation portion 30a dissipates heat through the air flowing through the first air passage 23a in the X-axis direction. The air flowing toward an end of the first duct portion 28 exits through the edge-side outlet 32 to the outside. The air flowing toward a middle of the first duct portion 28 exits through the middle outlet 33 to the outside. As described above, since the fans 31 enforce air circulation in the air passage 23, the heat dissipation portion 30a of the dissipative LED attachment portion 30 that faces the air passage 23 is efficiently cooled down, and thus heat from each LED 17 is dissipated. With this configuration, even if the LEDs 17 are collectively arranged close to the end portion of the chassis 14 and heat is more likely to stay at the end, heat dissipation efficiency is enhanced in the backlight unit 12. Accordingly, output of the LEDs 17 can be increased and brightness of exit light from the backlight unit 12 may be easily improved.

As described above, the backlight unit (the lighting device) 12 according to this embodiment includes the chassis 14, the LEDs (the light source) 17, the light guide plate (the light guide member) 19, the duct member 22, and the dissipative LED attachment portion (dissipative light source attachment portion) 30. The chassis 14 includes the light exit portion 14c through which light exits. The LEDs 17 are arranged close to the end portion of the chassis 14. The light guide plate 19 is arranged closer to the middle area of the chassis 14 than the LEDs 17 and configured to guide light from the LEDs 17 toward the light exit portion 14c side. The duct member 22 is arranged on the side opposite to the light exit portion 14c side of the chassis 14 and has the air passage 23 there inside. The dissipative LED attachment portion 30 is provided to the duct member 22. One part (the heat dissipation portion 30a) of the dissipative LED attachment portion 30 faces the air passage 23. Another part of the dissipative LED attachment portion 30 protrudes to a space within the chassis 14 and the LEDs 17 are attached thereto.

In this configuration, the other part of the dissipative LED attachment portion 30 protrudes to the space within the chassis 14, and the LEDs 17 that are attached to the other part of the dissipative LED attachment portion 30 are located close to the end portion of the chassis 14. Light emitted from the LED 17 is directed toward the light exit portion 14c side of the chassis 14 by the light guide plate 19 that is arranged in the inner area of the chassis 14 from the LEDs 17. Heat generated by light emission of the LED 17 is transferred to the one part of the dissipative LED attachment portion 30 that faces the air passage 23 of the duct member 22, and the heat is efficiently dissipated through air that flows through the air passage 23. With this configuration, even in the backlight unit 12 in which the LEDs 14 are arranged close to the end portion of the chassis 14 and heat is more likely to stay the end portion, heat dissipation properties remain high. Therefore, brightness of exiting light may be easily enhanced by increasing output of the LEDs 17. According to this embodiment, heat dissipation properties can be improved.

The lighting device further includes the fan (the blower) 30 mounted on the duct member 22. The fan 31 includes the blowing port 31a facing a part of the dissipative LED attachment portion 30 and through which air flows to the air passage 23. With this configuration, the air passing through the blowing port 31a of the fan 31 toward the air passage 23 efficiently hits a part of the dissipative LED attachment portion 30 opposite the blowing port 31a, and thus heat from the LED 17 is efficiently dissipated.

The duct member 22 includes the bottom wall 26 and at least a pair of sidewalls 27. The bottom wall 26 is opposite the chassis 14. The at least a pair of sidewalls 27 protrude from the bottom wall 26 toward the chassis 14 and face each other. The air passage 23 is a space surrounded and defined by the bottom wall 26, the at least a pair of sidewalls 27, and the chassis 14. With this configuration, the chassis 14 can be reinforced by the duct member 22 including the bottom wall 26 and the pair of sidewalls 27 that define the air passage 23 between the bottom wall 26 and the pair of sidewalls 27 and the chassis 14.

The duct member 22 includes the inlet 34 for air intake to the air passage and the outlet 35 for air exhaust from the air passage 23. Each of the inlet 34 and the outlet 35 opens to the outside along the wall surface of the bottom wall 26. With this configuration, heat from the dissipative LED attachment portion 30 is dissipated through air that flows through the inlets 34 and 35 into the air passage 23. The air through which the heat dissipates from the dissipative LED attachment portion 30 flows to the outside through the outlets 32 and 33. Each of the inlets 34 and 35 and the outlets 32 and 33 is formed so as to open to the outside along the wall surface of the bottom wall 26 of the duct member 22. If the inlets and outlets are formed in the bottom wall 26, a space for air intake and air exhaust is required behind the backlight unit 12. However, with the above configuration, such a space is not required or such a space is reduced.

At least one of the inlet 34, 35 and the outlet 32, 33 is provided to each of the at least a pair of sidewalls 27 such that the inlets 34 and 35 or the outlets 32 and 33 are displaced from each other in the direction along the wall surface of the bottom wall 26. Compared to a configuration that at least one of the inlet 34, 35 and the outlet 32, 33 is provided to each of the at least a pair of sidewalls 27 such that the inlets 34 and 35 or the outlets 32 and 33 are opposed to each other in the direction along the wall surface of the bottom wall, decrease in strength of the duct member 22 that may be caused by forming the inlets 34 and 35 or the outlets 32 and 33 is less likely to occur.

The duct member 22 covers a part of the chassis 14, the LED drive board (the light source drive board) 24 is provided on the side of the chassis 14 that is opposite to the light exit portion 14 side. The LED drive board 24 is located adjacent to the duct member 22. The LED drive board 24 is configured to provide a drive power to the LED 17. In this configuration, the LED drive board 24 is located on the side of the chassis 14 opposite to the light exit portion 14c side and adjacent to the duct member 22. Therefore, a thickness of the backlight unit 12 can be reduced compared with a case in which the LED drive board 24 is attached to the surface of the duct member 22 opposite to the chassis 14 side.

The duct member 22 includes the bottom wall 26 and at least a pair of sidewalls 27. The bottom wall 26 is opposite the chassis 14. The sidewalls 27 protrude from the bottom wall 26 toward the chassis 14 and face each other. The air passage 23 is a space surrounded and defined by the bottom wall 26, the at least a pair of sidewalls 27, and the chassis 14. The second sidewall 27c that is on the inside and adjacent to the LED drive board 24 includes the inner inlet 34 that opens to the outside along the wall surface of the bottom wall 26. The inner inlet 34 is displaced from the LED drive board 24 in the direction along the wall surface of the bottom wall 26. With this configuration, heat is dissipated from the dissipative LED attachment portion 30 through air that flows into the air passage 23 through the inner inlet 34 that is provided in the second sidewall portion 27c on the inner side of the duct member 22. The second sidewall portion 27c adjacent to the LED drive board 24 includes the inner inlet 34 that is displaced from the LED drive board 24 in the direction along the wall surface of the bottom wall 26. Therefore, even when the LED drive board 24 provides drive power to the LED 17 and the LED 17 generates heat, relatively low-temperature air flows to the air passage 23 through the inlet 34. Accordingly, sufficient heat dissipation performance can be obtained. Further, the chassis 14 can be reinforced by the duct member 22.

The dissipative LED attachment portion 30 extends along the end portion of the chassis 14 and the LEDs 17 are mounted on the dissipative light source attachment portion so as to be arranged in the extending direction of the dissipative LED attachment portion 30. The air passage 23 of the duct member 22 is provided along the extending direction of the dissipative LED attachment portion 30. In this configuration, the LEDs 17 are arranged in the extending direction of the dissipative LED attachment portion 30. Therefore, heat generated by the LEDs 17 is efficiently dissipated through air that flows in the air passage 23 extending in the extending direction of the dissipative LED attachment portion 30. Accordingly, sufficient heat dissipation performance can be obtained.

The duct member 22 includes the first duct portion 28 and the second duct portion 29. The first duct portion 28 extends along the extending direction of the dissipative LED attachment portion 30 and includes the dissipative LED attachment portion 30. The second duct portion 29 extends in the direction across the extending direction of the dissipative LED attachment portion 30. The second duct portion 29 is connected to the first duct portion 29. The fan 31 is mounted to the second duct portion 29. The fan 31 includes the blowing port 31a that is opposite a part of the dissipative LED attachment portion 30. Air flows to the air passage 23 through the blowing port 31a. In this configuration, the duct member 22 includes the first duct portion 28 that extends along the extending direction of the dissipative LED attachment portion 30. The second duct portion 29 extends along the direction across the extending direction of the dissipative LED attachment portion 30 and connected to the first duct portion 28. This increases the mechanical strength of the duct member 22 and also reinforces the chassis 14 to which the duct member 22 is attached. Further, the blower 31 is attached on the second duct portion 29 and air that flows to the air passage 23 through the blowing port 31a of the blower 30 efficiently hits a part of the dissipative LED attachment portion 30 of the first duct portion 29 that faces the blowing port 31a. Therefore, heat generated from the LEDs 17 is efficiently dispersed with the air.

The chassis 14 includes the bottom plate 14a and the fixing piece 36. The bottom plate 14a is located on the side of the chassis 14 that is opposite to the light exit portion 14c side and defines the air passage 23 between the bottom plate 14a and the duct member 22. The fixing piece 36 protrudes from the bottom plate 14a toward the side opposite to the light exit portion 14c side so as to be parallel to the dissipation LED attachment portion 30. The fixing piece 36 is fixed to the dissipative LED attachment portion 30. The fixing piece 36 faces the air passage 23 and is located opposite the blowing port 31a of the fan 31. With this configuration, by fixing the fixing piece 36, which protrudes from the bottom plate 14a of the chassis 14, to the dissipative LED attachment portion 30, the chassis 14 and the duct member 22 can be fixed. Air that flows through the blowing port 31a of the fan 31 hits the fixing piece 36 that faces the air passage 23 and is located opposite the blowing port 31a. Therefore, a part of the dissipative LED attachment portion (a portion to which the fixing piece 36 is attached) which faces the blowing port 31a is less likely to be locally cooled down. Accordingly, the dissipative LED attachment portion 30 can be evenly cooled down over the extending direction.

The second duct portion 29 includes the pair of second duct portions 29 opposite to each other and connected to the first duct portion 28 apart from each other in a direction in which the first duct portion 28 extends. The LED drive board 24 is provided to the side opposite to the light exit portion 14c side of the chassis 14 and located between the pair of second duct portions 29. The LED drive board 24 is configured to provide a drive power to the LED 17. With this configuration, the fan 31 that is attached to each of the second duct portions 29 blows air and a part of the dissipative LED attachment portion 30 of the first duct portion 28 can be efficiently cooled down. Further, the LED drive board 24 is arranged on the side of the chassis 14 that is opposite to the light exit portion 14c side and located between the pair of the second duct portions 29. Therefore, the thickness of the backlight unit 12 can be reduced and the LED board 24 can be protected by the pair of the second duct portions 29.

The dissipative LED attachment portion 30 of the first duct portion 28 includes the middle outlet 33 at the position between the pair of the second duct portions 29. The middle outlet 33 opens to the outside and through which air in the air passage exits. In this configuration, the dissipative LED attachment portion 30 includes the middle outlet 33 that opens to the outside at a position between the pair of the second duct portions 29. The fan 31 is attached to each of the second duct portions 29. Air that is blown by the fan 31 to the first duct portion 29 efficiently exits to the outside through the middle outlet 33. Accordingly, air-flow properties inside the air passage improve and thus heat dissipation properties improve.

The dissipative LED attachment portions 30 and the first duct portions 28 extends along the respective end portions of the chassis 14. The ends of the second duct portion 29 are connected to the respective first duct portions 28. In this configuration, the first duct portions 28 extend along the respective end portions of the chassis 14 and the end portions of the second duct portion 29 are connected to the first duct portions 28. Therefore, the duct member 22 can have high mechanical strength, and accordingly the chassis 14 to which the duct member 22 is attached is reinforced.

Second Embodiment

A second embodiment of this invention will be described with reference to FIGS. 9 to 11. In the second embodiment, a duct member 122 includes receiving portions 37 to receive a chassis 114. The same structures, operations, and effects as those of the first embodiment will not be described.

Figure 9:
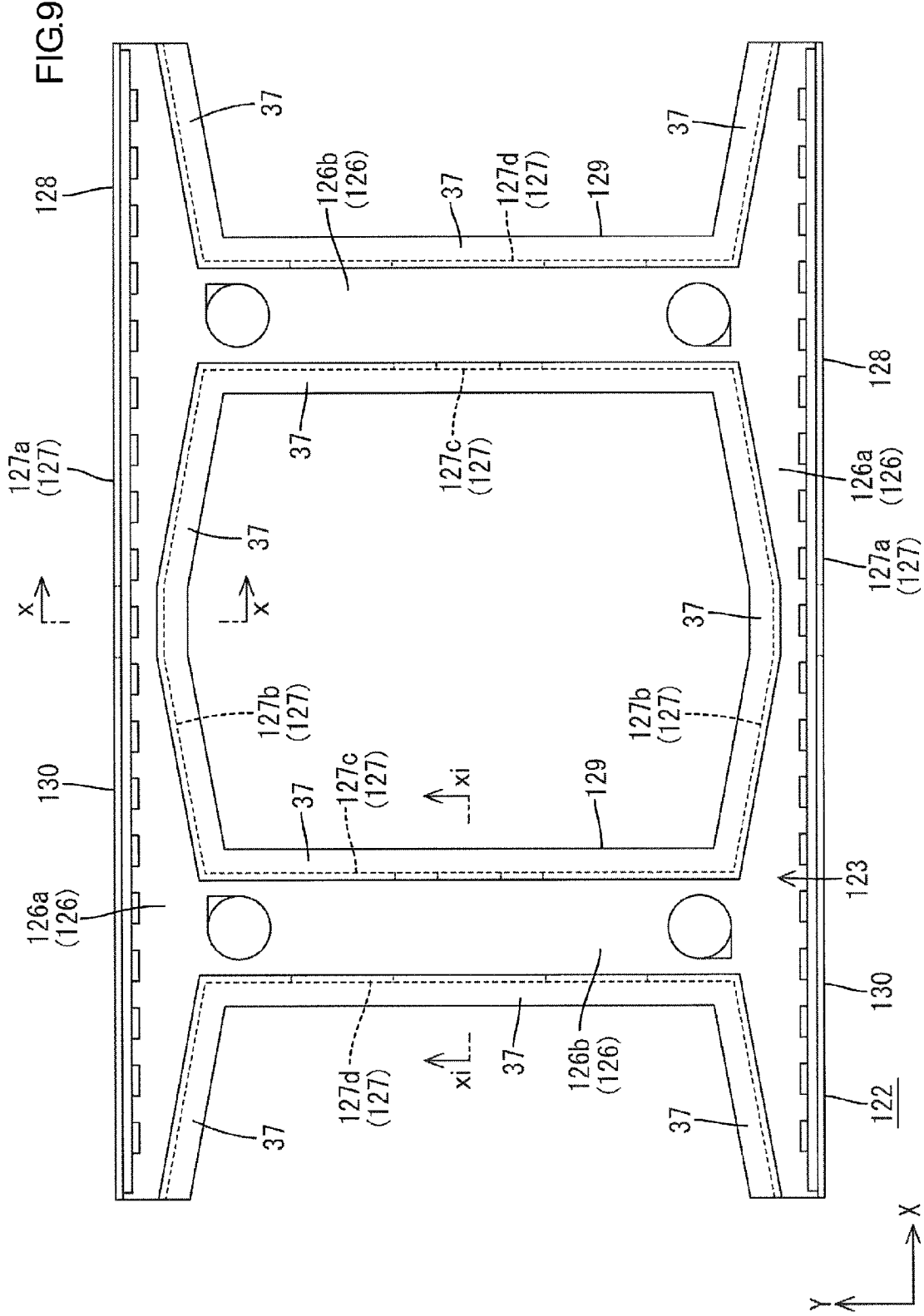
FIG. 9 is a plan view illustrating an arrangement configuration of a duct member, LED boards, and fans according to a second embodiment of this invention.
Figure 10:
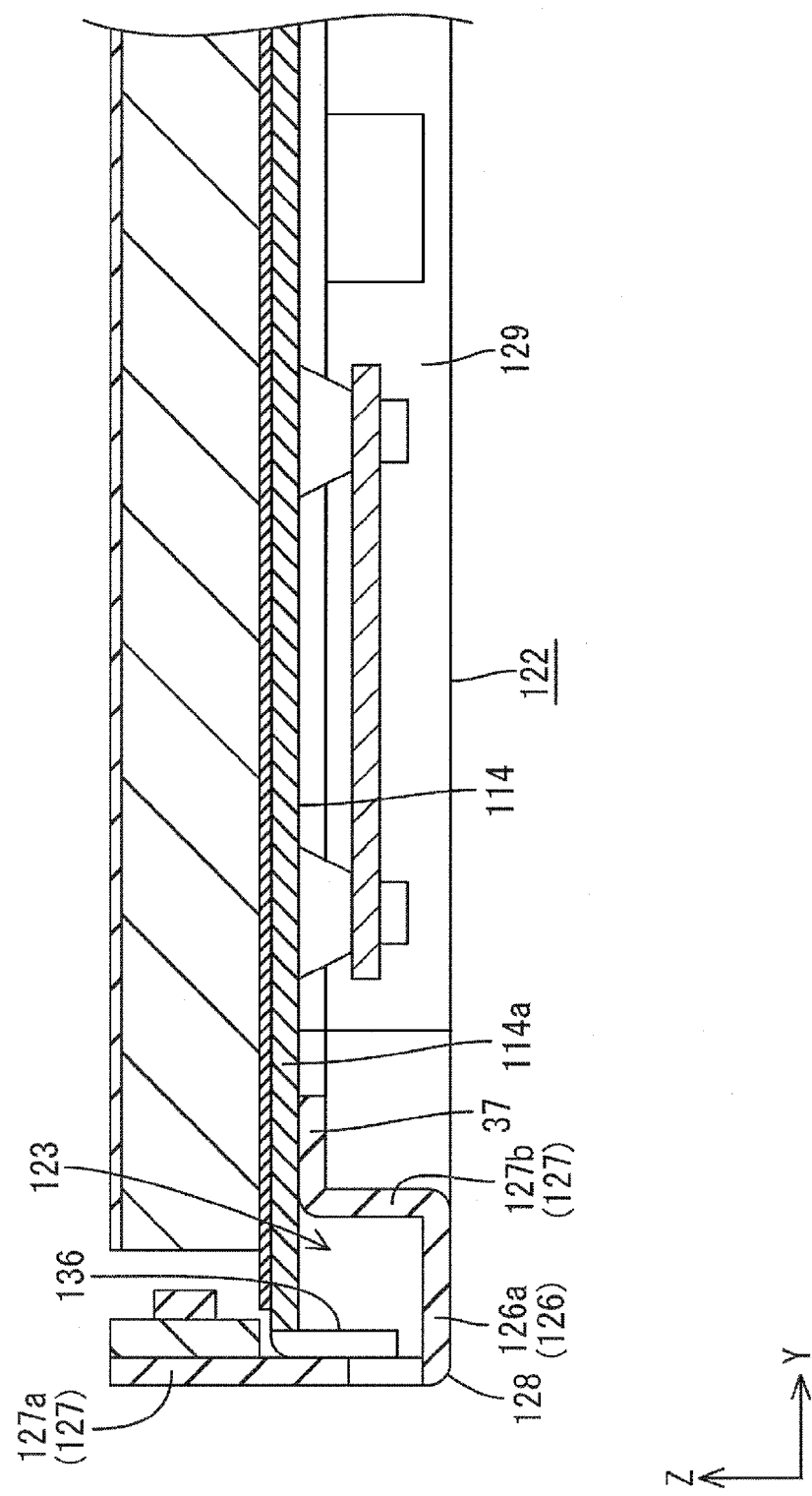
FIG. 10 is a cross-sectional view taken along line x-x of FIG. 9.
Figure 11:
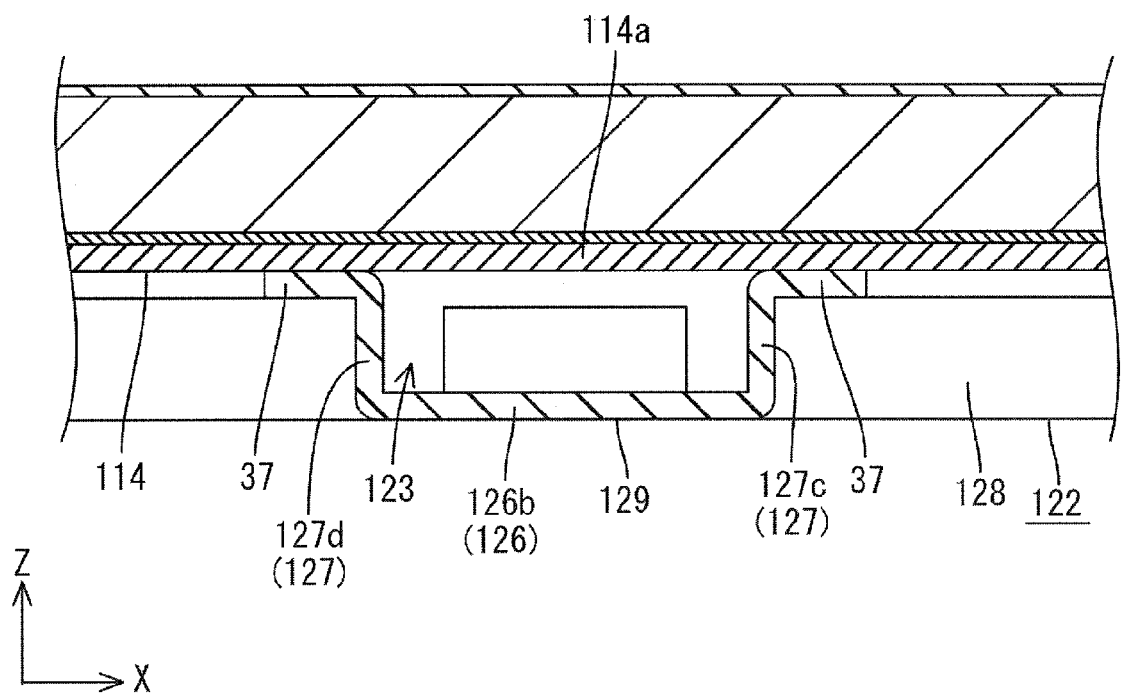
FIG. 11 is a cross-sectional view taken along line xi-xi of FIG. 9.

As illustrated in FIGS. 9 to 11, the duct member 122 according to this embodiment includes sidewalls 127. Some of the sidewalls 127 include the receiving portions 37 that receive a bottom plate 114a of the chassis 114 from the rear side. Each sidewall 127 protrudes from a bottom wall 126 of the duct member 122 and has a distal end portion. Each receiving portion 37 is a plate piece that is bent from the distal end portion of the corresponding sidewall 127. Plate surfaces of the receiving portion 37 are parallel to the bottom plate 114a of the chassis 114. Among the sidewalls 127, the sidewalls 127 having the distal end portions that are opposite the bottom plate 114a include the receiving portions 37. Specifically, an inner first sidewall portion 127b of each of the first duct portions 128 and second sidewall portions 127c and 127d of each of the second duct portions 129 include the receiving portions 37. Outer first sidewall portions 127a (dissipative LED attachment portions 130) do not include the receiving portions 37. The receiving portions 37 extend along the sidewall portions 127b, 127c, and 127d over the entire lengths. A front plate surface of each receiving portion 37 is in surface-contact with a rear plate surface of the bottom plate 114a and fixed thereto by welding or screws. As a result, the receiving portions 37, together with fixing pieces 136 of the chassis 114, can establish a stable attachment relationship between the chassis 114 and the duct member 122.

As described above, according to this embodiment, the chassis 114 includes the bottom plate 114a that is on an opposite side of the chassis 114 from a light exit portion. The bottom plate 114a and the duct member 122 define an air passage 123 in between. The duct member 122 includes the bottom wall 126 and at least a pair of sidewalls 127. The bottom wall 126 is opposite the chassis 114. The sidewalls 127 in each pair are opposite to each other and protrude from the bottom wall 126 toward the chassis 114. A space defined by the bottom wall 126, at least one pair of sidewalls 127, and the bottom plate 114a is the air passage 123. The at least a pair of sidewalls 127 includes the receiving portions 37 that is parallel to the bottom plate 114a to receive the bottom plate 114a. With such a configuration, because the bottom plate 114a of the chassis 114 is received by the receiving portions 37, the receiving portions 37 can establish a further stable attachment relationship between the chassis 114 and the duct member 112.

Third Embodiment

A third embodiment of this invention will be described with reference to FIGS. 12 and 13. In the third embodiment, arrangement of middle outlets 233 is changed. The same structures, operations, and effects as those of the first embodiment will not be described.

Figure 12:
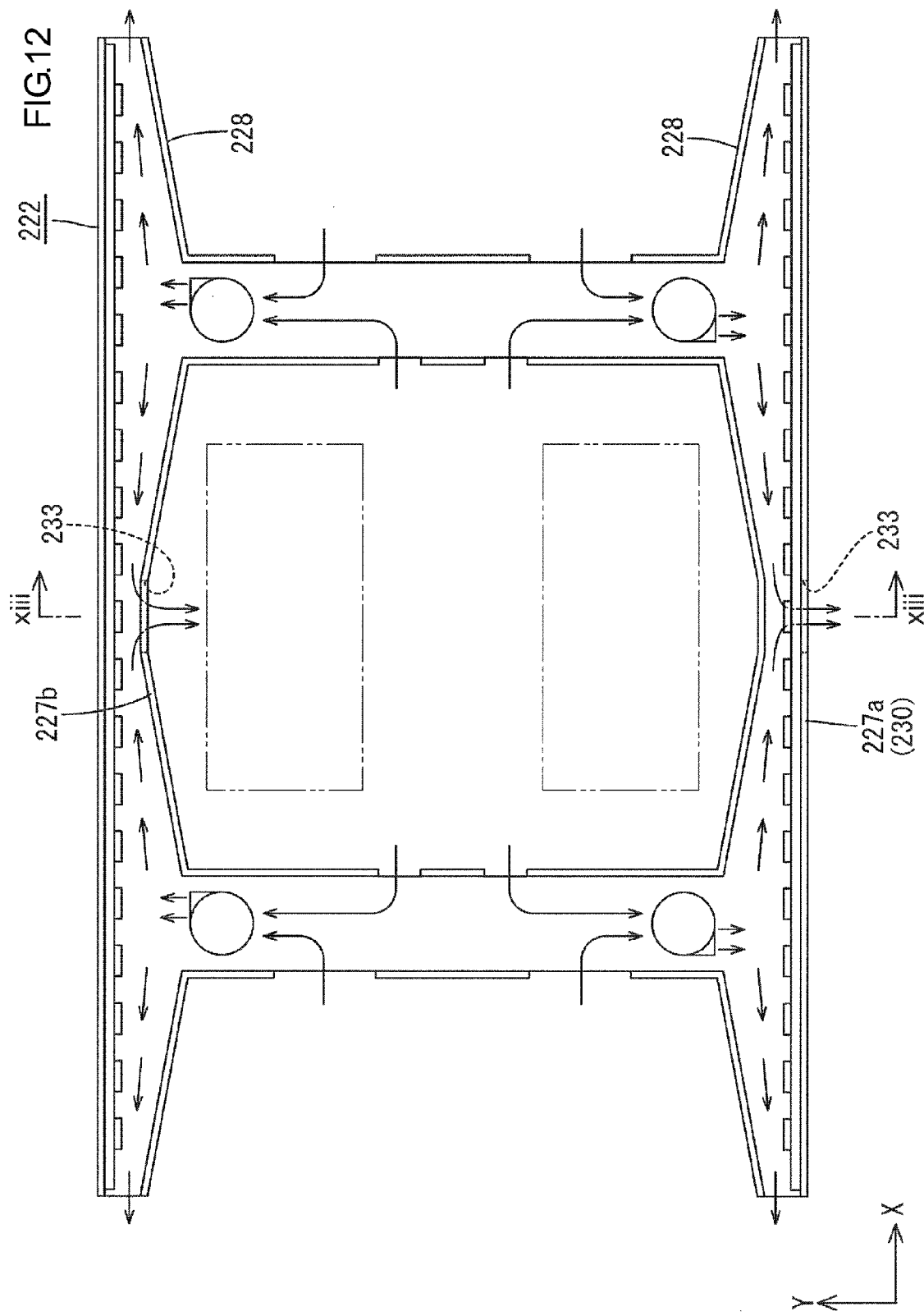
FIG. 12 is a plan view illustrating an arrangement configuration of a duct member, LED boards, and fans according to a third embodiment of this invention.
Figure 13:
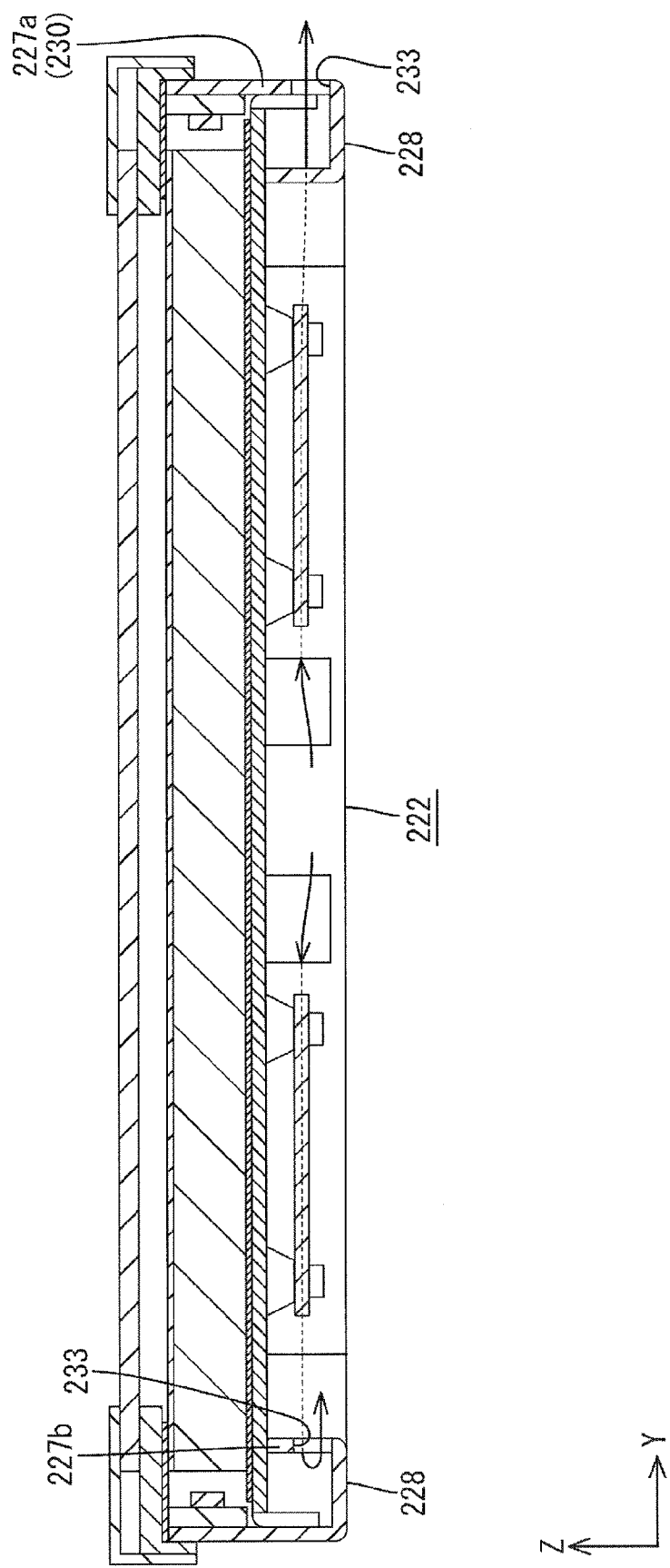
FIG. 13 is a cross-sectional view taken along line xiii-xiii of FIG. 12.

As illustrated in FIGS. 12 and 13, the middle outlets 233 are formed in a duct member 222 such that the middle outlets 233 open downward in the vertical direction. In FIGS. 12 and 13, each Y-axis direction corresponds to the vertical direction and each X-axis direction corresponds to the horizontal direction. An upper side and a lower side in FIG. 12 correspond to an upper side and a lower side in the vertical direction, respectively. In the duct member 222, one of first duct members 228 on the upper side (a left in FIG. 13) in FIG. 12 includes an inner first sidewall portion 227b that is located on the lower side thereof in the vertical direction. One of the middle outlets 233 is formed in the inner first sidewall portion 227b. On the other hand, the other one of the first duct members 228 on the lower side (a right in FIG. 13) in FIG. 12 includes an outer first sidewall portion 227a (a dissipative LED attachment portion 230) that is located on the lower side thereof in the vertical direction. The other one of the middle outlets 233 is formed in the outer first sidewall portion 227a. In this configuration, the middle outlets 233 open downward in the vertical direction in the sidewall portions 227a, 227b and not open upward. Therefore, external dust is less likely to enter an air passage 223 through the middle outlets 233.

Fourth Embodiment

A fourth embodiment of this invention will be described with reference to FIGS. 14 and 15. In the fourth embodiment, first duct portions 328 include second edge-side outlets 38. The same structures, operations, and effects as those of the first embodiment will not be described.

Figure 14:
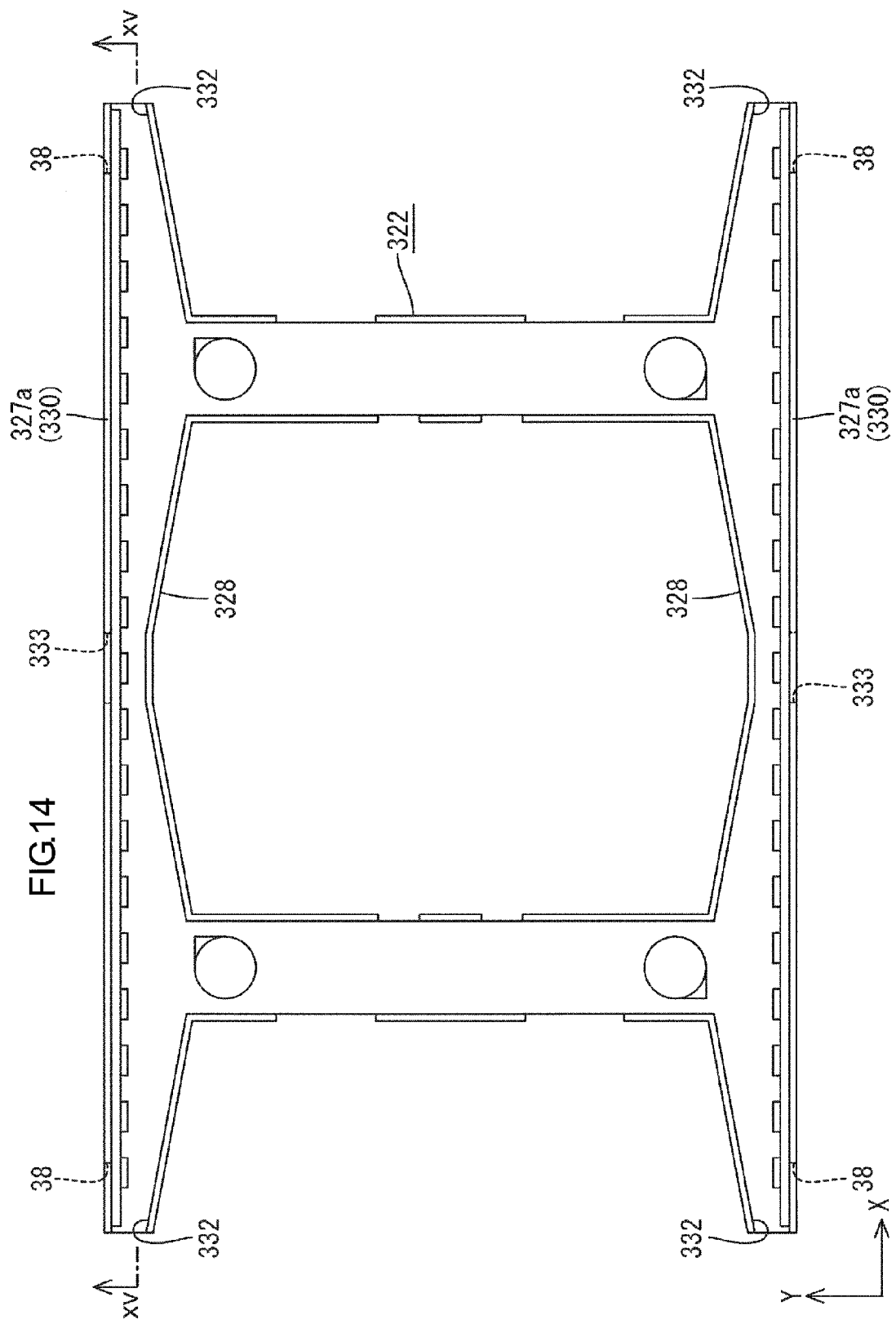
FIG. 14 is a plan view illustrating an arrangement configuration of a duct member, LED boards, and fans according to a fourth embodiment of this invention.
Figure 15:
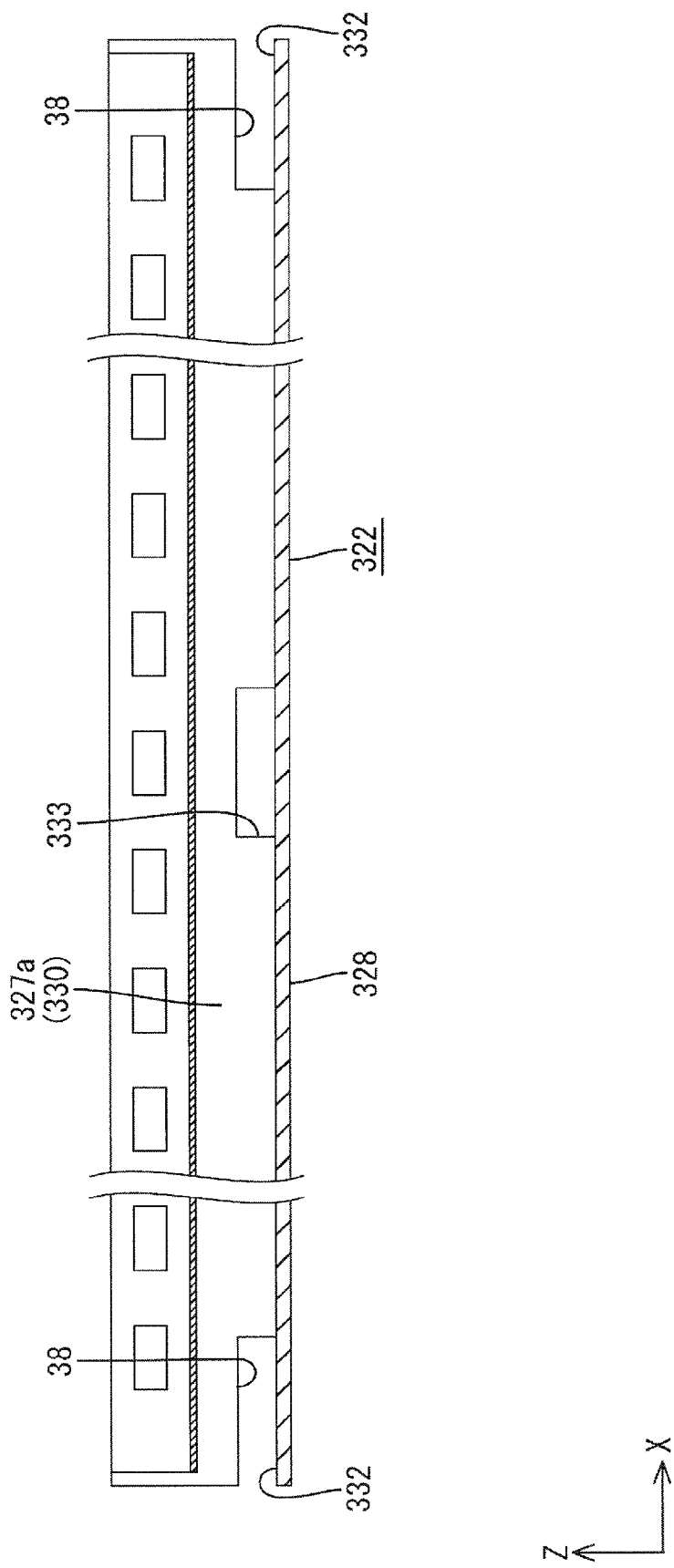
FIG. 15 is a cross-sectional view taken along line xv-xv of FIG. 14.

As illustrated in FIGS. 14 and 15, each of the first duct portions 328 according to this embodiment includes a first sidewall portion 327a (dissipative LED attachment portions 330). Each of the outer first sidewall portions 327a includes second edge-side outlets 38 that open to the outside and communicate with respective edge-side outlets 332. Each second edge-side outlet 38 is located at a corresponding end portion of each outer first sidewall portion 327a in its extending direction (the X-axis direction), and communicates with the corresponding edge-side outlet 332 adjacent thereto. The second edge-side outlet 38, similar to a middle outlet 333, opens to the outside along the Y-axis direction (an upper-lower direction in FIG. 14). In some cases, due to restrictions on an installation environment of the liquid crystal display device, it may not be allowed to discharge air that is present in a duct member 322 toward the horizontal direction in FIG. 14. In such cases, the edge-side outlets 332 among the outlets 332, 333, and 38 may be closed and the air may be discharged through the middle outlets 333 and the second edge-side outlets 38 that open in an upper-lower direction in FIG. 14. On the contrary, if air-discharging from the duct member 322 in the upper-lower direction in FIG. 14 is not allowed, the middle outlets 333 and the second outlets 38 may be closed and the air may be discharged through the edge-side outlets 332 that open in the horizontal direction in FIG. 14. With this configuration, the outlets 332, 333, and 38 can be opened and closed as appropriate according to the restrictions such as an installation environment of the liquid crystal display device. Thus, such restrictions can be easily addressed and sufficient heat dissipation properties can be obtained constantly. The liquid crystal display device may be used with all of the outlets 332, 333, and 38 open.

Fifth Embodiment

A fifth embodiment of this invention will be described with reference to FIG. 16. In the fifth embodiment, the shape of middle outlets 433 is changed. The same structures, operations, and effects as those of the first embodiment will not be described.

Figure 16:
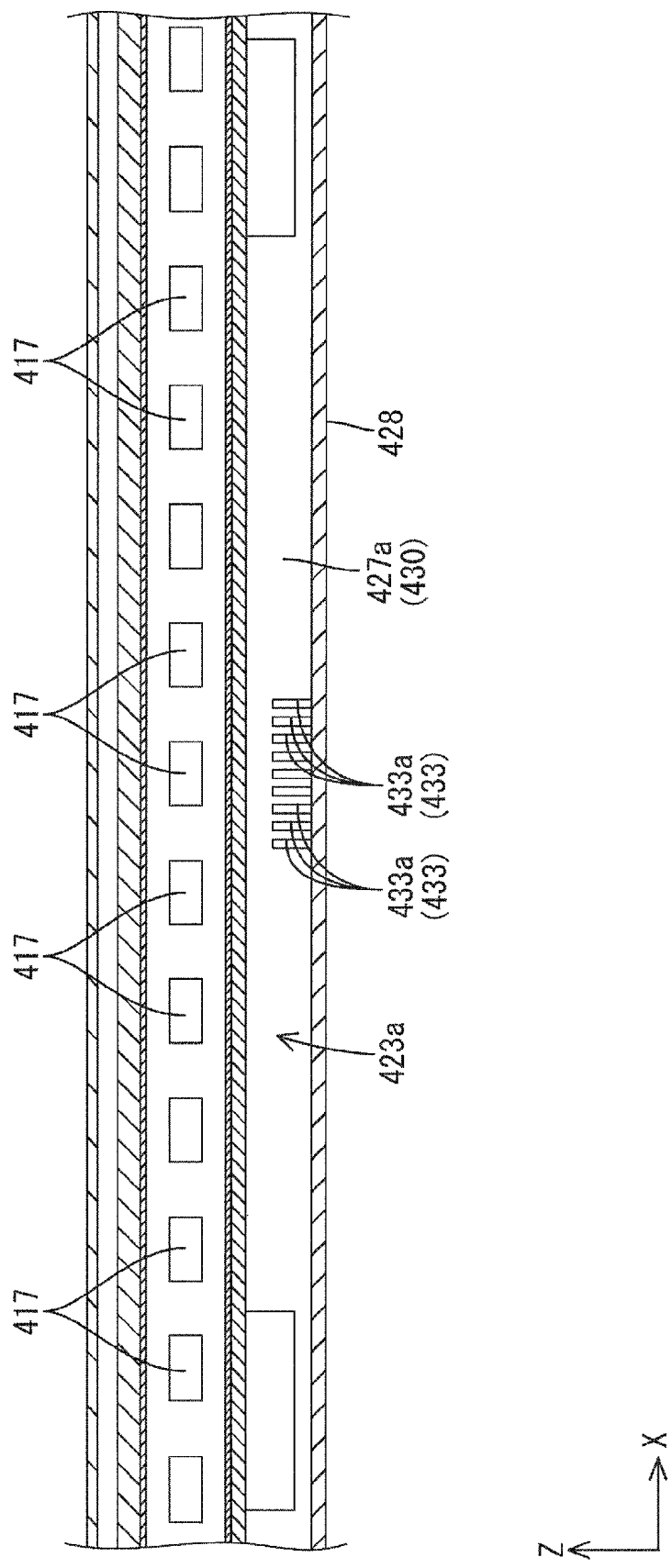
FIG. 16 is a cross-sectional view illustrating an inner outlet of a duct member according to a fifth embodiment of this invention.

As illustrated in FIG. 16, a first duct portion 428 includes a first sidewall portion 427a (a dissipative LED attachment portion 430) on an outer side thereof. The first sidewall portion 427a includes a middle outlet 433. The middle outlet 433 according to this embodiment includes divided outlet portions 433a that are arranged in line along the X-axis direction. Specifically, each of the divided outlet portions 433a has a longitudinal rectangular shape in a front view. The divided outlet portions 433a are arranged at equal intervals from each other along an extension direction of the first sidewall portion 427a and form the middle outlet 433 having a landscape rectangular shape. An arrangement direction of the divided outlet portions 433a corresponds to a length direction of the middle inlet 433. In this configuration, air in a first air passage 423a contacts separation portions that separate the divided outlet portions 433a of the outer first sidewall portion 427a. Heat is dissipated from the separation portions through the air that contacts the separation portion and exits out through the divided outlets 433a. With this configuration, LEDs 417 that are arranged close to the middle outlet 433 can be evenly cooled down compared with a case in which the middle outlet 433 has a simple opening having a landscape rectangular shape such as in the first embodiment. Thus, cooling unevenness is less likely to occur. In particular, cooling unevenness is more likely to occur if the middle outlet 433 has a longer length than the LED 417. However, with the middle outlet 433 having the divided outlet portions 433*a*, occurrence of the cooling unevenness is effectively reduced.

Sixth Embodiment

Figure 18:
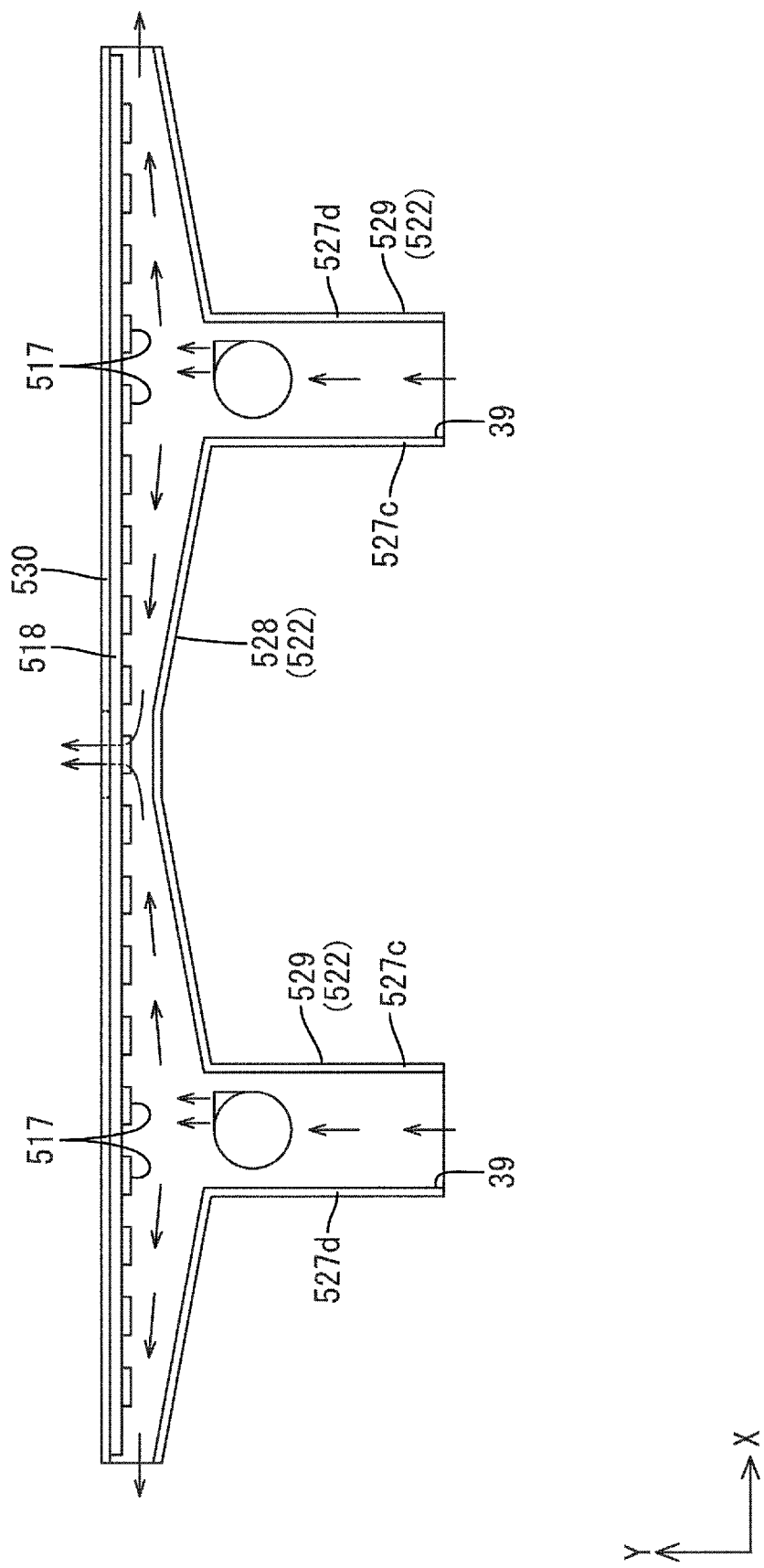
FIG. 18 is a plan view illustrating an arrangement configuration of a duct member, an LED board, and fans.
Figure 19:
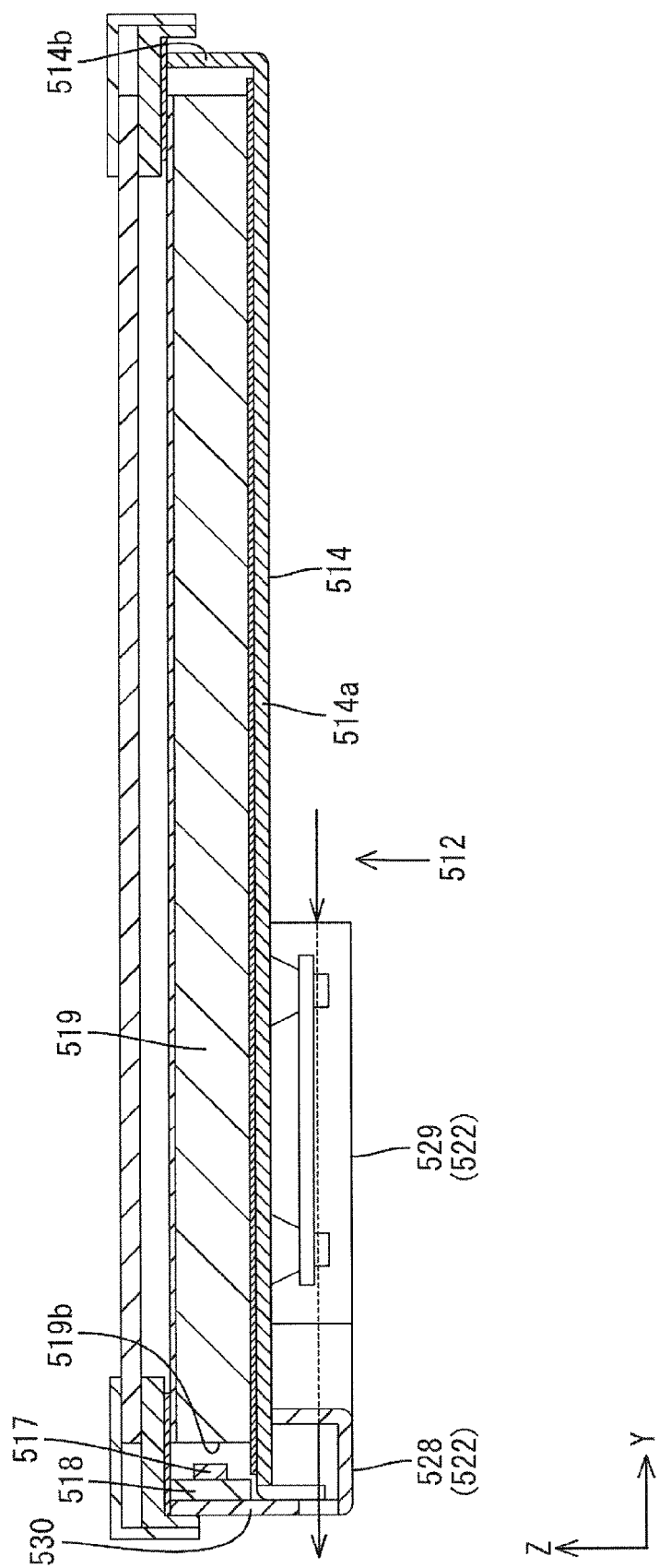
FIG. 19 is a cross-sectional view taken along line xix-xix of FIG. 17.

A sixth embodiment of this invention will be described with reference to FIGS. 17 to 19. In the sixth embodiment, an LED 518 is disposed on one side of a light guide plate 519. Accordingly, configurations of a duct member 522 and a chassis 514 are changed. The same structures, operations, and effects as those of the first embodiment will not be described.

Figure 17:
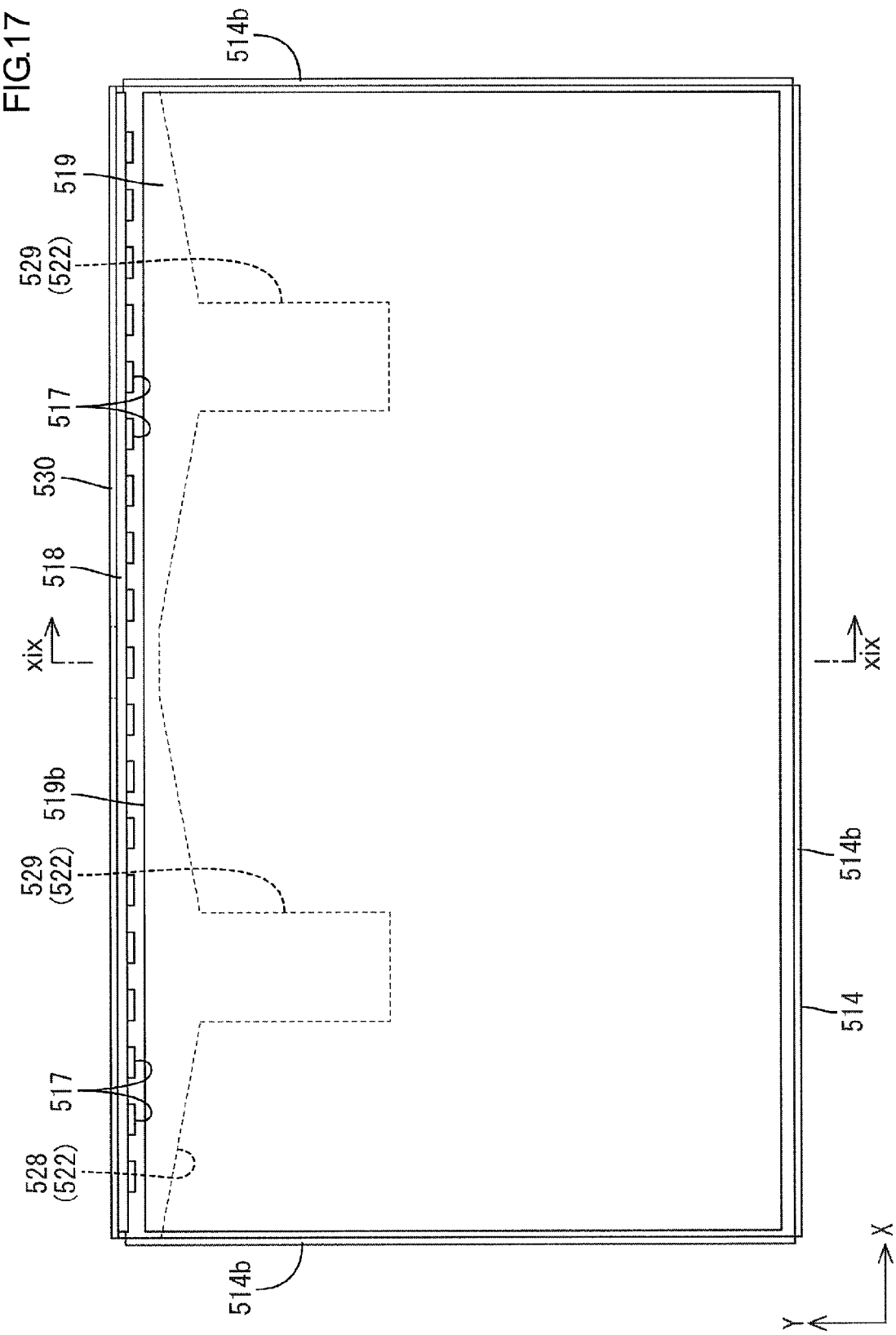
FIG. 17 is a plan view illustrating an arrangement configuration of a chassis, a duct member, a light guide plate, and an LED board according to a sixth embodiment of this invention.

As illustrated in FIG. 17, the light guide plate 519 includes a pair of long-side surfaces, and an LED board 518 according to this embodiment is arranged opposite one of the long-side surfaces (a light entrance surface 519*b*) of the light guide plate 519 on an upper side in FIG. 17. As illustrated in FIGS. 18 and 19, the duct member 522 includes a first duct portion 528 and a pair of second duct portions 529. The first duct portion 528 includes a dissipative LED attachment portion 530 on which an LED board 518 is mounted. Each of the second duct portions 529 are connected to the first duct portion 528. The second duct portion 529 has end portions in an extending direction (the Y-axis direction) thereof. One of the end portions is connected to the first duct portion 528. The other one of the end portions opens to the outside. The other end portion is an inlet 39 through which external air flows in. The second duct member 529 includes second sidewall portions 527*c* and 527*d*. The sidewall portions 527*c* and 527*d* do not include the inner inlet 34 or the outer inlet 35 as in the first embodiment. A configuration of the first duct portion 528 is similar to the configuration of the first embodiment. With the duct member 522 having such a configuration, heat from LEDs 517 that are collectively arranged in one end portion of a backlight unit 512 can be efficiently cooled down. Further, a reduction in size or weight of the duct member 522 can be achieved. As illustrated in FIGS. 17 and 19, the chassis 514 includes a bottom plate 514*a* and side plates 514*b*. The bottom plate 514*a* has peripheral end portions. The side plates 514*b* protrude from three of peripheral end portions that do not face the LED boards 518 (a dissipative LED attachment portions 530).

Seventh Embodiment

A seventh embodiment of this invention will be described with reference to FIGS. 20 and 21. In the seventh embodiment, arrangement of a pair of LED boards 618 is changed, and accordingly, configurations of a duct member 622 and a chassis 614 are changed. The same structures, operations, and effects as those of the first embodiment will not be described.

Figure 20:
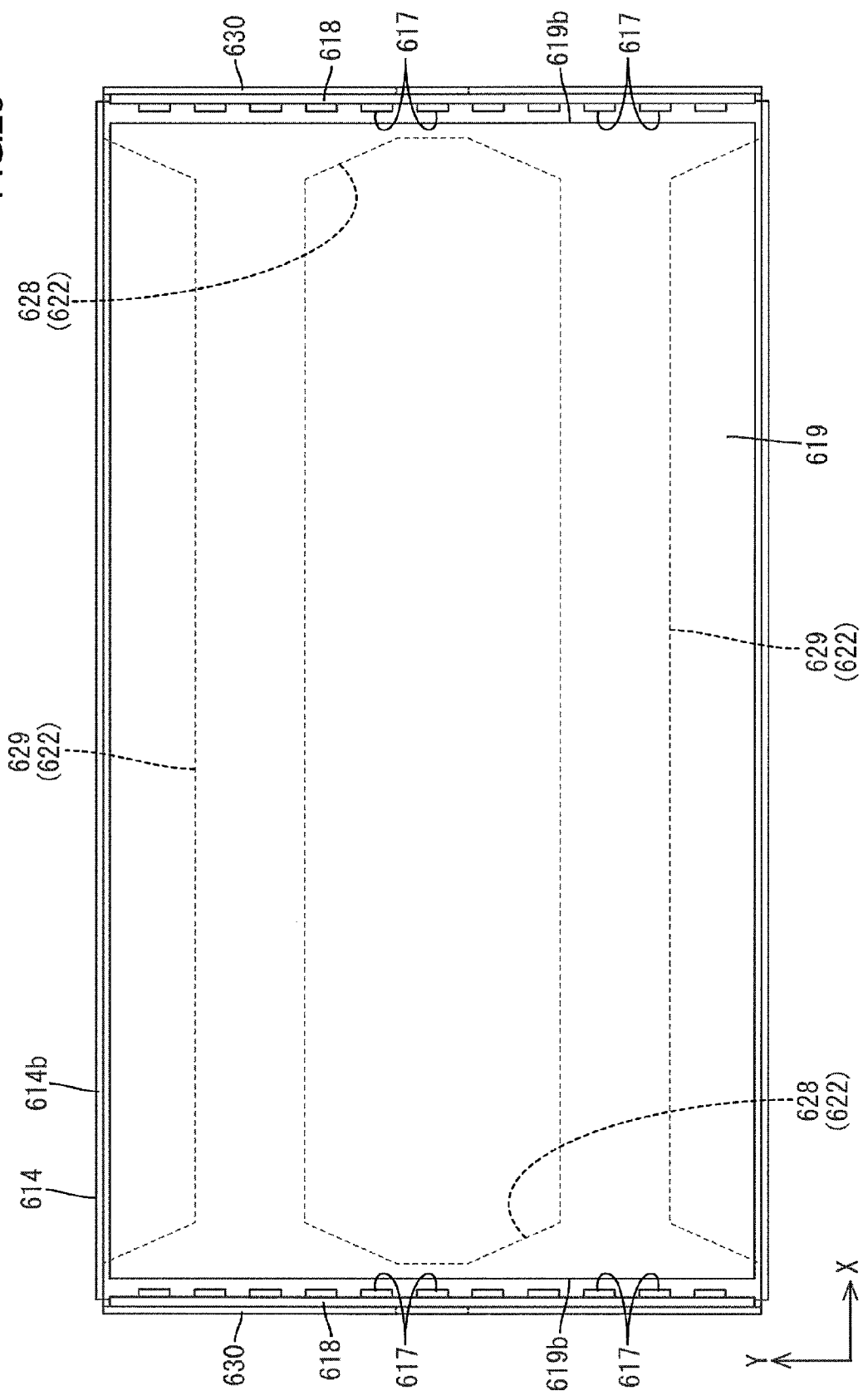
FIG. 20 is a plan view illustrating an arrangement configuration of a chassis, a duct member, a light guide plate, and LED boards according to a seventh embodiment of this invention.
Figure 21:
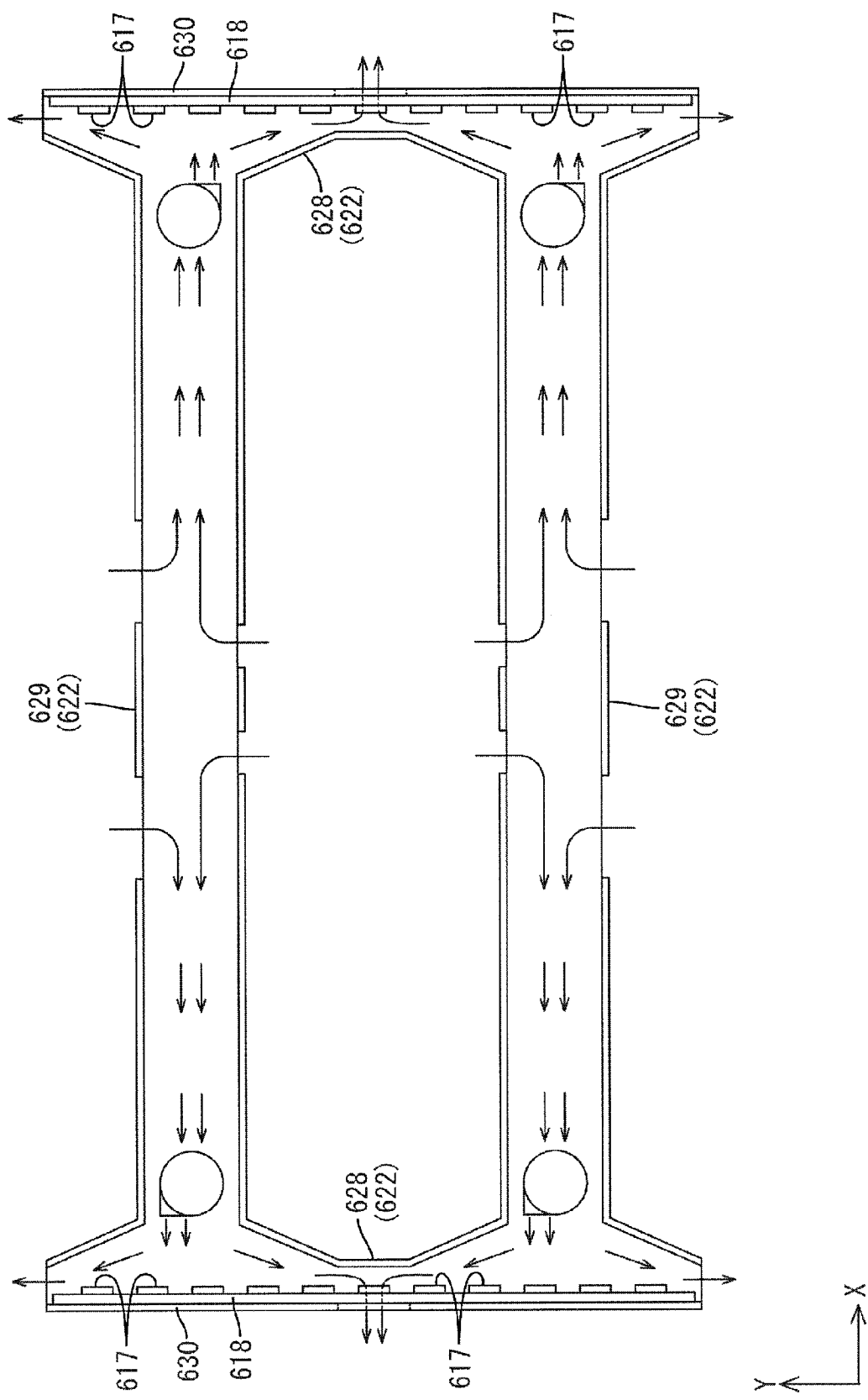
FIG. 21 is a plan view illustrating an arrangement configuration of a duct member, LED boards, and fans.

As illustrated in FIG. 20, LED boards 618 in pairs according to this embodiment are arranged on sides of a light guide plate 619 with respect to a long-side direction (X-axis direction) so as to sandwich the light guide plate 619 in between. Each of the LED boards 618 extends along a short-side direction (Y-axis direction) of the light guide plate 619. Multiple LEDs 617 are arranged along an extending direction of the LED board 618. Among end surfaces of the light guide plate 619, a pair of end surfaces along the short-side direction of the light guide plate 619 is a light entrance surface 619*b*. As illustrated in FIG. 21, the duct member 622 includes a pair of first duct portions 628. Each of the first duct portions 628 extends along the extending direction of the LED board 618, that is, along the Y-axis direction. Each first duct portion 628 includes a dissipative LED attachment portion 630 that is arranged along an extending direction of the first duct portion 628. The duct member 622 includes a pair of second duct portions 629. Each second duct portions 629 extends in a direction perpendicular to the extending direction of the first duct portion 628, i.e. in the X-axis direction. End portions of each second duct portion 629 are connected to the respective first duct portions 628. In this embodiment, the LED boards 618 and the duct member 622 are arranged at positions rotated by 90 degrees with respect to the arrangement in the first embodiment in a plan view. However, the same operations and effects as those of the first embodiment can be obtained. As illustrated in FIG. 20, a chassis 614 includes side plates 614*b* in pairs arranged on long sides thereof.

Eighth Embodiment

An eighth embodiment of this invention will be described with reference to FIGS. 22 and 23. In the eighth embodiment, the number and arrangement of second duct portions 729 of a duct member 722 are changed. The same structures, operations, and effects as those of the first embodiment will not be described.

Figure 22:
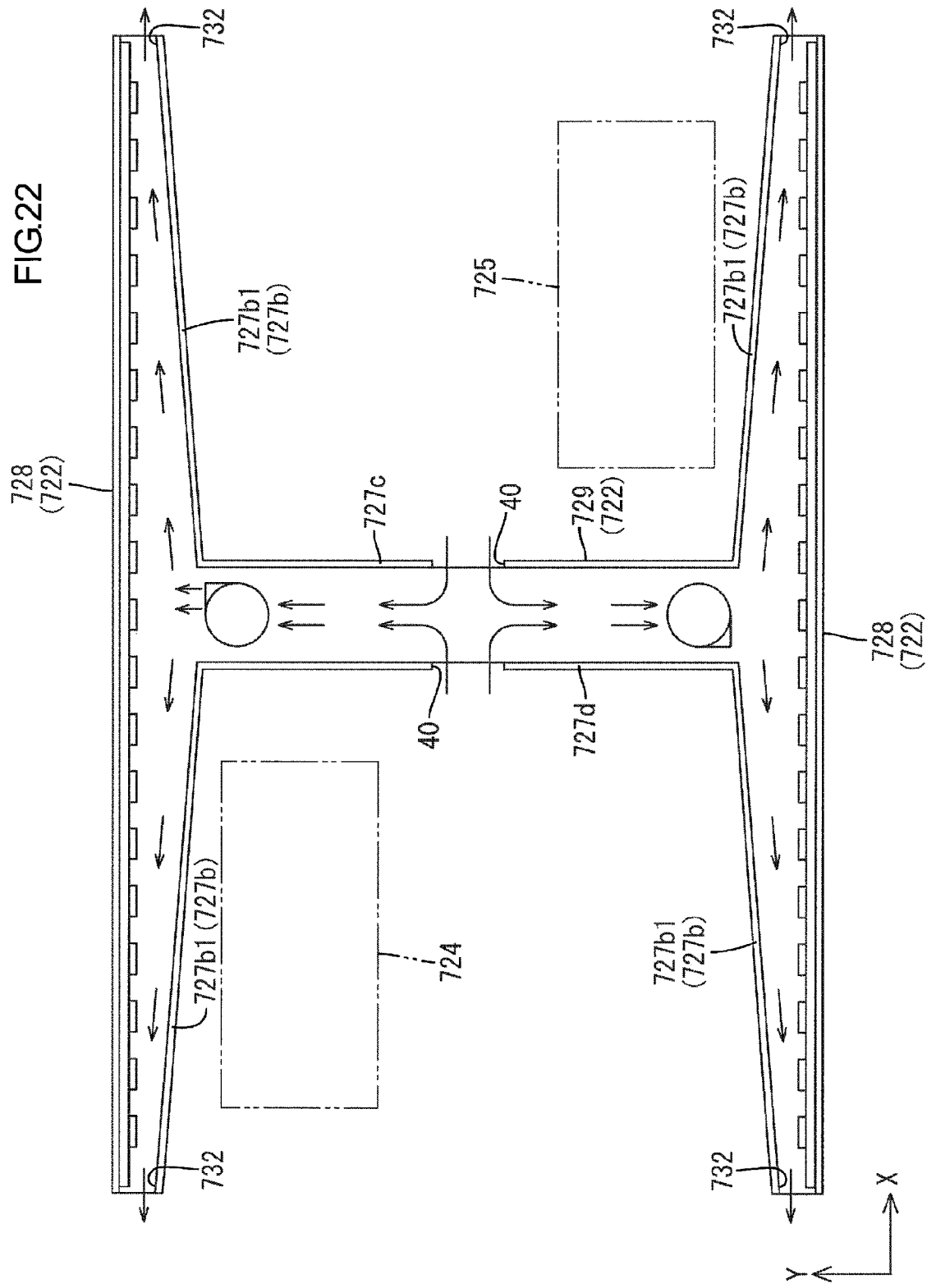
FIG. 22 is a plan view illustrating an arrangement configuration of a duct member, LED boards, and fans according to an eight embodiment of this invention.

As illustrated in FIG. 22, the duct member 722 according to this embodiment includes a pair of first duct portions 728 and a second duct portions 729 that is connected to the first duct portions 728. Each end of the second duct portion 729 is connected to a substantially middle part of the corresponding first duct portion 728 in an extending direction of the first duct portion 728. The duct member 722 has an H-like shape as a whole in a plan view. The second duct portion 729 is arranged in a substantially middle area of a chassis 714 in a long-side direction of the chassis 714 (see FIG. 23). The second duct portion 729 includes a pair of second sidewalls 727*c* and 727*d*. Each of the second sidewalls 727*c* and 727*d* includes an inlet 40 at a substantially middle part of the second sidewalls 727*c* and 727*d* in an extending direction. Each of the first duct portions 728 is tapered from a connection portion with the second duct portion 729 toward edge inlets 732 disposed at ends of the first duct portion 728. Namely, inner first sidewall portions 727*b* of each first duct portion 728 are tapered portions 727*b*1. The first duct portion 728 does not include the middle outlet 33 that is included in the first embodiment. According to the configuration change of the duct member 722 as described above, arrangement of an LED drive board 724 and a control board 725 is changed. Specifically, as illustrated in FIG. 23, the LED drive board 724 and the control board 725 are disposed at locations different from the second duct portion 729 in the X-axis direction. Further, the LED drive board 724 and the control board 725 are disposed at locations different from the inlets 40 included in the second duct portion 729 in the Y-axis direction (see FIG. 22).

Ninth Embodiment

A ninth embodiment of this invention will be described with reference to FIGS. 24 and 25. In the ninth embodiment, a duct member 822 only includes first duct portions 828. The same structures, operations, and effects as those of the first embodiment will not be described.

As illustrated in FIGS. 24 and 24, the duct member 822 according to this embodiment extends along an extending direction of LED boards 818, that is, the X-axis direction. The duct member 822 includes first duct portions 828 in pairs each having a dissipative LED attachment portion 830 that is parallel to the duct member 822. The duct member 822 in this embodiment does not include the second duct portions 29 in pairs that are included in the first embodiment. In other words, the duct member 822 includes two separate parts, namely, the first duct portions 828 are not connected to each other. Each of the first duct portions 828 includes a first bottom wall portion 826a. A pair of fans 831 is attached to each first bottom wall portion 826a. The fans 831 are located in intermediate areas between a middle area and end areas of the first duct portion 828 in the extension direction. Each fan 831 has a blowing port 831a and an intake port 831b. The blowing port 831a faces an edge-side outlet 832 that is located at an end of the first duct portion 828 in the extending direction. The intake port 831b faces the middle area of the first duct portion 828 in the extending direction. The first duct portion 828 includes first a pair of sidewalls 827a and 827b. Each of the first sidewalls 827a and 827b includes an inlet 41 at a substantially middle area of each wall in an extending direction thereof. External air enters an air passage 823 through the inlet 41 and flows to the intake port 831b of the fan 831. An LED drive board 824 and a control board 825 are disposed at locations different from the first duct portions 828 in the Y-axis direction. Further, the LED drive board 824 and the control board 825 are disposed at locations different from the inlet 41 of each first duct portion 828 in the X-axis direction.

OTHER EMBODIMENTS

The scope of this invention is not limited to the embodiments described in the above description with reference to the drawings. The following embodiments may be included in the technical scope of this invention, for example.

(1) In the above embodiments, the LED attachment portion and the heat dissipation portion included in the dissipative LED attachment portion continues to each other without steps. However, the LED attachment portion may continue to the heat dissipation portion via a bent portion. Specifically, the LED attachment portion may be arranged outward from the heat dissipation portion and a bent portion may connect the LED attachment portion and the heat dissipation portion.

(2) In the above embodiments, the LED attachment portion and the heat dissipation portion included in the dissipative LED attachment portion has the same dimension in length. However, the LED attachment portion and the heat dissipation portion may have different dimensions in length. In such a case, the LED attachment portion may be shorter than the heat dissipation portion and vice versa.

(3) In the above embodiments, the LED attachment portion of the dissipative LED attachment portion has a length over the entire length of the LED board. However, the LED attachment portion may have a length shorter than the entire length of the LED board. In such a case, multiple LED attachment portions may be attached to a single LED board.

(4) In the above embodiments, the heat dissipation portion of the dissipative LED attachment portion has a length over the entire length of the duct member. However, the heat dissipation portion may have a length shorter than the entire length of the duct member. In such a case, multiple heat dissipation portions may be arranged so as to face an air passage.

(5) In the above embodiments, the duct member has a hollow shape that opens to the chassis side. However, the duct member may have a hollow shape that does not open to a chassis side. Specifically, the duct member may include a bottom wall, a pair of sidewalls protruding from the bottom wall, and a top wall that is connected to extended ends of the pair of sidewalls and opposite the bottom wall. The top wall may be attached to the bottom plate of the chassis.

(6) Other than the above embodiments, in the duct member, the arrangement or the number of the second duct portions to the first duct portion may be altered as appropriate. For example, the second duct portions may be connected at ends of the first duct portion in the extending direction, or three or more second duct portions may be connected to the first duct portion.

(7) Other than the above embodiments, the plan-view shapes of the first duct portion and the second duct portion of the duct member, or the shapes of the bottom wall and the sidewall may be altered as appropriate.

(8) Other than the above embodiments, the arrangement, the number, the shape, or the size (an opening area) of the inlet and the outlet of the duct member may be altered as appropriate.

(9) Other than the above embodiments, the arrangement, the shape, or the size of the LED drive board and the control board may be altered as appropriate. If boards other than the LED drive board and the control board are attached to a rear surface of the chassis, the arrangement described in the above embodiments may be applied to the boards.

(10) In the above embodiments, the positions (orientations of the blowing port and the intake port) of the fan may be reversed. In such a case, the inlets of the duct member in each of the above embodiments may be used as the outlets, and the outlets of the duct member in each of the above embodiments may be used as the inlets. Even in such a configuration, heat of the LEDs can be released via the dissipative LED attachment portion and adequate heat dissipation properties can be obtained.

(11) In the above embodiments, the fans disposed in the duct member is the sirocco fans. However, other types of fan (e.g. propeller fans or turbo fans) may be used.

(12) In the above embodiments, the fans are disposed in the duct member to enforce ventilation. However, fans may be not included in silent oriented type devices.

(13) Other than the above embodiments, the arrangement and the number of the fan in the duct member may be altered as appropriate.

(14) In the above embodiments, the fixing pieces of the chassis are arranged opposite the blowing ports of the respective fans. However, this invention includes a configuration in which the fixing pieces are arranged so as not to be opposite the blowing ports.

(15) In the above sixth embodiment, the LED board is arranged along one of the long-side end portions of the light guide plate. However, the LED board may be arranged along one of short-side end portions of the light guide plate. In such a case, according to the arrangement change of the LED board, the arrangement of the dissipative LED attachment portion of the duct member and the arrangement of the side plate of the chassis may be altered.

(16) Other than the above embodiments, the LED boards may be arranged opposite the three end portions of the light guide plate, or all of the four end portions of the light guide plate. In such a case, according to the arrangement change of the LED boards, the arrangement of the dissipative LED attachment portion of the duct member and the arrangement of the side plate of the chassis may be altered. In particular, in a configuration in which the LED boards are arranged opposite the four sides of the light guide plate, the chassis may not include the side plates.

(17) In the above embodiments, one LED board is arranged on one side of the light guide plate. However, two or more LED boards may be arranged on one side of the light guide plate.

(18) In the above embodiments, the edge-light backlight unit including the light guide plate is used. However, this invention may be applied to an edge-light backlight unit without a light guide plate. In such an edge-light backlight unit, an optical lens (for example, a diffuser lens having diffusing effect) which provides optical effects to light from LEDs may be used as a light guide member. With this configuration, light from the LEDs that are collectively arranged at an end of a chassis is directed to a light exit surface of the chassis, and the uneven light is applied to a plate surface a liquid crystal panel.

(19) In the above embodiments, the color filter includes color portions in three colors. However, the color filter may include color portions in four colors with a yellow color in addition to red, green, and blue colors.

(20) In the above embodiments, the LEDs are used as light sources. However, other types of light sources such as organic ELs may be used.

(21) In the above embodiments, the liquid crystal panel and the chassis are set in the vertical position with the short-side directions thereof correspond to the vertical direction. However, the liquid crystal panel and the chassis may be set in the vertical position with long-side directions thereof correspond to the vertical direction.

(22) In the above embodiments, the TFTs are used as switching components of the liquid crystal display device. However, the technology described herein can be applied to liquid crystal display devices using switching components other than TFTs (e.g. thin film diodes (TFDs)). Furthermore, the technology can be applied to back- and white liquid crystal display devices other than the color liquid crystal display device.

(23) In the above embodiments, the liquid crystal display device includes the liquid crystal panel as a display panel is used. However, this invention can be applied to display devices including other types of display panels.

(24) In the above embodiments, the television device including the tuner is used. However, this invention can be applied to a display device without a tuner. Specifically, this invention can be applied to liquid crystal display devices used for digital signage or electric blackboards.

EXPLANATION OF SYMBOLS

10: liquid crystal display device (display device), 11: liquid crystal panel (display panel), 12, 512: backlight unit (lighting device), 14, 114, 514, 614, 714: chassis, 14a, 114a, 514a: bottom plate, 14c: light exit portion, 17, 417, 517, 617: LED (light source), 19, 519, 619: light guide plate (light guide member), 22, 122, 222, 322, 522, 622, 722, 822: duct member, 23, 123, 823: air passage, 24, 724, 824: LED drive board (light source drive board), 26, 126: bottom wall, 27, 127: sidewall, 28, 128, 228, 428, 528, 628, 728: first duct portion, 29, 129, 229, 529, 629, 729: second duct portion, 30, 130, 230, 330, 430, 530, 630, 830: dissipative LED attachment portion (dissipative light source attachment portion), 30a: heat dissipation portion (one part), 30b: LED attachment portion (another part), 31, 831: fan (blower), 31a, 831a: blowing port, 32, 332, 732, 832: edge-side outlet (outlet), 33, 233, 333, 433: middle outlet (outlet), 34: inner inlet (inlet), 35: outer inlet (inlet), 36: fixing piece, 38: second edge-side outlet (outlet), 39: inlet, 40: inlet, 41: inlet, TV: television device.

The invention claimed is:

1. A lighting device, comprising:
   a chassis including a light exit portion through which light exits;
   a light source arranged close to an end portion of the chassis;
   a light guide member arranged closer to a middle area of the chassis than the light source and configured to guide light from the light source toward a light exit portion side;
   a duct member arranged on a side of the chassis opposite to the light exit portion side and having an air passage therein; and
   a dissipative light source attachment portion provided to the duct member and including:
      one part facing the air passage, and
      another part protruding to inside of the chassis and to which the light source is attached,
   wherein the duct member includes:
      a bottom wall opposite the chassis; and
      at least a pair of sidewalls protruding from the bottom wall toward the chassis and facing each other,
   wherein the air passage is a space surrounded and defined by the bottom wall, the at least a pair of sidewalls, and the chassis,
   wherein the duct member includes an inlet for air intake to the air passage and an outlet for air exhaust from the air passage, each of the inlet and the outlet opening to outside along a wall surface of the bottom wall,
   wherein at least one of the inlet and the outlet is provided in each sidewall of the at least a pair of sidewalls so as to be displaced from each other in a direction along the wall surface of the bottom wall.

2. The lighting device according to claim 1, further comprising a blower mounted to the duct member, the blower having a blowing port facing a part of the dissipative light source attachment portion and through which air flows to the air passage.

3. A display device, comprising:
   the lighting device according to claim 1; and
   a display panel configured to provide display using light from the lighting device.

4. A television device comprising the display device according to claim 3.

5. A lighting device, comprising:
   a chassis including a light exit portion through which light exits;
   a light source arranged close to an end portion of the chassis;
   a light guide member arranged closer to a middle area of the chassis than the light source and configured to guide light from the light source toward a light exit portion side;
   a duct member arranged on a side of the chassis opposite to the light exit portion side and having an air passage therein; and
   a dissipative light source attachment portion provided to the duct member and including:
      one part facing the air passage, and
      another part protruding to inside of the chassis and to which the light source is attached,
   wherein the duct member covers a part of the chassis, and the lighting device further comprising a light source drive board provided on a side of the chassis that is opposite to the light exit portion side and adjacent to the duct member, the light source drive board being configured to provide drive power to the light source,
   wherein the duct member includes:
      a bottom wall opposite the chassis; and
      at least a pair of sidewalls protruding from the bottom wall toward the chassis and facing each other, wherein the air passage is a space surrounded and defined by the bottom wall, the at least a pair of sidewalls, and the chassis, and wherein one of the sidewalls located adjacent to the light source drive board includes an inlet that opens to outside along a wall surface of the bottom wall, the inlet being displaced from the light source drive board along the wall surface of the bottom wall.

6. A lighting device, comprising:

a chassis including a light exit portion through which light exits;

a light source arranged close to an end portion of the chassis;

a light guide member arranged closer to a middle area of the chassis than the light source and configured to guide light from the light source toward a light exit portion side;

a duct member arranged on a side of the chassis opposite to the light exit portion side and having an air passage therein; and a dissipative light source attachment portion provided to the duct member and including:
one part facing the air passage, and
another part protruding to inside of the chassis and to which the light source is attached, wherein the light source includes a plurality of light sources, wherein the dissipative light source attachment portion extends along the end portion of the chassis and the light sources are mounted on the dissipative light source attachment portion so as to be arranged in an extending direction of the dissipative light source attachment portion, wherein the air passage of the duct member is provided along the extending direction of the dissipative light source attachment portion wherein the duct member includes:
a first duct portion extending along the extending direction of the dissipative light source attachment portion and including the dissipative light source attachment portion; and
a second duct portion extending in a direction across the extending direction of the dissipative light source attachment portion, the second duct portion being connected to the first duct portion, and the lighting device further comprising a blower mounted to the second duct portion, the blower including a blowing port opposite a part of the dissipative light source attachment portion and through which air flows to the air passage.

7. The lighting device according to claim 6, wherein the chassis includes:
a bottom plate located on a side of the chassis that is opposite to the light exit portion side of the chassis and defining the air passage between the bottom plate and the duct member; and
a fixing piece protruding from the bottom plate toward the side opposite to the light exit portion side so as to be parallel to the dissipation light source attachment portion, the fixing piece being fixed to the dissipative light source attachment portion,
wherein the fixing piece faces the air passage and is located opposite the blowing port of the blower.

8. The lighting device according to claim 6, wherein the second duct portion includes a pair of second duct portions opposite to each other and connected to the first duct portion apart from each other in a direction in which the first duct portion extends, and
the lighting device further comprising a light source drive board provided on the side of the chassis opposite to the light exit portion side and located between the pair of second duct portions, the light source drive board being configured to provide drive power to the light source.

9. The lighting device according to claim 6,
wherein the dissipative light source attachment portion includes a pair of dissipative light source attachment portions and the first duct portion includes a pair of first duct portions,
wherein each of the dissipative light source attachment portions and each of the first duct portions extends along the end portion of the chassis,
wherein each end of the second duct portion is connected to each of the pair of the first duct portions.

10. The lighting device according to claim 8, wherein the dissipative light source attachment portion of the first duct portion includes an outlet at a position between the pair of the second duct portions, the outlet opening to outside through which air in the air passage exits.

* * * * *